US012363580B2

(12) United States Patent
Liu et al.

(10) Patent No.: US 12,363,580 B2
(45) Date of Patent: Jul. 15, 2025

(54) WIRELESS SIGNAL PROPAGATION PREDICTION METHOD AND APPARATUS

(71) Applicant: Huawei Technologies Co., Ltd., Guangdong (CN)

(72) Inventors: Xin Liu, Shenzhen (CN); Guanxiang Ying, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 18/145,396

(22) Filed: Dec. 22, 2022

(65) Prior Publication Data

US 2023/0131579 A1  Apr. 27, 2023

Related U.S. Application Data

(63) Continuation of application No. PCT/CN2021/102180, filed on Jun. 24, 2021.

(30) Foreign Application Priority Data

Jun. 24, 2020 (CN) .......................... 202010591522.9

(51) Int. Cl.
*H04W 24/00* (2009.01)
*H04W 28/02* (2009.01)
(Continued)

(52) U.S. Cl.
CPC ... *H04W 28/0236* (2013.01); *H04W 28/0967* (2020.05); *H04W 24/02* (2013.01)

(58) Field of Classification Search
CPC ... H04W 16/18; H04W 16/22; H04W 64/003; H04W 24/02; H04W 64/00; H04W 84/18;
(Continued)

(56) References Cited

U.S. PATENT DOCUMENTS

| 8,165,599 B1* | 4/2012 | Dronamraju | H04W 64/00 455/456.6 |
| 2015/0186506 A1* | 7/2015 | Vandevoorde | G01S 5/0284 707/737 |
| 2015/0373501 A1* | 12/2015 | Dribinski | H04W 4/029 455/456.1 |

FOREIGN PATENT DOCUMENTS

| CN | 102780536 A | 11/2012 |
| CN | 102781062 A | 11/2012 |
(Continued)

OTHER PUBLICATIONS

Sun Wei-wei et al, Handover algorithm combined with location prediction in 3GPP LTE systems, 2012, 4 pages.

*Primary Examiner* — Quan M Hua
(74) *Attorney, Agent, or Firm* — WOMBLE BOND DICKINSON (US) LLP

(57) ABSTRACT

This application discloses a wireless signal propagation prediction method, and the method includes: obtaining S first sampling points in prediction space, and obtaining a first parameter of the prediction space through calculation based on location information of the S first sampling points and corresponding wireless signal received strength; obtaining a target algorithm based on the first parameter, and generating a wireless signal propagation model of the prediction space based on the target algorithm, the location information of the S first sampling points, and the corresponding wireless signal received strength; and obtaining wireless signal received strength of a terminal at any location in the prediction space based on the wireless signal propagation model of the prediction space. This application further discloses a wireless signal propagation prediction apparatus.

30 Claims, 13 Drawing Sheets

(51) Int. Cl.
*H04W 28/08* (2023.01)
*H04W 24/02* (2009.01)

(58) Field of Classification Search
CPC ....... H04W 16/20; H04W 4/50; H04W 4/025; H04W 16/24; H04W 84/06; H04W 12/12; H04W 12/122; H04W 12/63; H04W 16/10; H04W 16/225; H04W 16/26; H04W 40/20; H04W 4/60; H04W 16/32; H04W 24/08; H04W 28/0268; H04W 4/022; G06N 3/08; G06N 3/092; G06N 3/006; G06N 3/042; G06N 3/0442; G06N 3/0464; G06N 3/096; H02J 2203/20; H02J 2310/60; H02J 3/144; H02J 2203/10
See application file for complete search history.

(56) References Cited

FOREIGN PATENT DOCUMENTS

| | | | |
|---|---|---|---|
| CN | 104467997 | A | 3/2015 |
| CN | 104703215 | A | 6/2015 |
| CN | 105187139 | A | 12/2015 |
| CN | 105357707 | A | 2/2016 |
| CN | 106842155 | A | 6/2017 |
| CN | 106162871 | B | 5/2019 |
| CN | 109996168 | A | 7/2019 |
| CN | 110418354 | A | 11/2019 |
| EP | 2928243 | A1 | 10/2015 |
| WO | 2010001376 | A1 | 1/2010 |

\* cited by examiner

WIRELESS SIGNAL PROPAGATION PREDICTION METHOD AND APPARATUS

CROSS-REFERENCE TO RELATED APPLICATIONS

This application is a continuation of International Application No. PCT/CN2021/102180, filed on Jun. 24, 2021, which claims priority to Chinese Patent Application No. 202010591522.9, filed on Jun. 24, 2020. The disclosures of the aforementioned applications are hereby incorporated by reference in their entireties.

TECHNICAL FIELD

This application relates to the field of wireless signals, and in particular, to a wireless signal propagation prediction method and apparatus.

BACKGROUND

Wireless signal propagation prediction is a core capability for wireless communications network planning, construction, and optimization, and is a part of competitiveness of wireless network solutions. There were a plurality of lawsuits related to the precision of wireless signal propagation prediction in the past. For a long time, research methods of wireless signal propagation prediction mainly include propagation models, ray tracing, and the like. However, based on current research results, current research methods cannot achieve a balance between precision and operation efficiency of wireless signal propagation prediction. In particular, this problem is aggravated with accelerated 5G deployment around the world.

With rapid development of digitalization, the Internet of Things becomes a primary focus of 5G. Internet of Awareness and Internet of Everything gradually become a reality. A large quantity of fixed connections provide new input for wireless signal propagation prediction and lay a foundation for new wireless signal propagation prediction solutions. Conventional wireless signal propagation prediction solutions mainly include a drive test mode and prediction based on a wireless propagation model.

The drive test mode includes: After a network is stable, a drive test path is planned. In a planning process, spatial unbiased sampling of sampling points needs to be focused on, and a wireless propagation feature needs to be fully considered. The following key points need to be met simultaneously: covering far and near areas of a base station; covering a direct-radiated area and a non-direct-radiated area; and covering various spatial geographical features in a to-be-tested area, for example, different heights and different spatial functional areas. If manpower and material resources are sufficient, all coverage areas of a to-be-tested cell need to be traversed as much as possible. After the planned path is determined, drive test personnel usually use test devices to collect signals point by point based on the planned path, and then perform signal prediction based on the collected signals. Costs of the drive test mode are high. Every year, a lot of manpower and material resources are consumed for drive tests, and a length may reach tens of millions of kilometers or more. However, coverage areas are mainly roads, and non-road areas and even indoor space are still blind spots. Usually, a service is generated in non-road space. Therefore, a result obtained by using the drive test method may have an estimation deviation.

Propagation model-based prediction is performing an abstract process for a wireless channel based on a mathematical language after fully understanding an environment that affects wireless propagation and a propagation feature of wireless propagation. Propagation models are mainly classified into statistical models and deterministic models. However, both the statistical model and the deterministic model are wireless channel propagation models obtained based on an electromagnetic wave propagation theory, and some simplification processing needs to be performed in a process of model and method establishment. Especially, in the statistical model, a large difference from an actual measured signal usually exists. In comparison, precision of the deterministic model is slightly improved, but a complex calculation process in the deterministic model and a strict requirement on calculation input (for example, precise construction and restoration of three-dimensional building information) restrict wide use of this method.

SUMMARY

Embodiments of this application provide a wireless signal propagation prediction method and apparatus. According to embodiments of this application, precision of a wireless signal propagation model is improved, and accuracy of obtaining wireless signal received strength of a terminal at any location in prediction space based on the wireless signal propagation model is improved.

According to a first aspect, an embodiment of this application provides a wireless signal propagation prediction method, and the method includes:

obtaining location information of each of S first sampling points in prediction space and wireless signal received strength of a terminal at a location indicated by the location information, where S is an integer greater than 1; obtaining a first parameter of the prediction space through calculation based on location information of the S first sampling points and corresponding wireless signal received strength, where the first parameter is used to indicate a degree of a global spatial autocorrelation characteristic of the prediction space; obtaining a target algorithm based on the first parameter, and generating a wireless signal propagation model of the prediction space based on the target algorithm, the location information of the S first sampling points, and the corresponding wireless signal received strength; and obtaining wireless signal received strength of the terminal at any location in the prediction space based on the wireless signal propagation model of the prediction space.

A larger value of the first parameter indicates a higher degree of the global spatial autocorrelation characteristic of the prediction space.

In an embodiment, the location information may be coordinates, or may be grid information indicating a location. The wireless signal received strength of a terminal at a location is a value used to indicate the strength of the received signal.

A suitable algorithm is selected according to a specific policy, and a wireless signal propagation model is generated based on the algorithm and a plurality of sampling points in the prediction space. This improves precision of the wireless signal propagation model, and improves accuracy of obtaining wireless signal received strength of the terminal at any location in the prediction space based on the wireless signal propagation model.

In an embodiment, the obtaining a target algorithm based on the first parameter of the prediction space includes:

obtaining a first algorithm and determining the first algorithm as the target algorithm when determining, based on the first parameter, that the prediction space has the global spatial autocorrelation characteristic; or obtaining a second algorithm and determining the second algorithm as the target algorithm when determining, based on the first parameter, that the prediction space has the global spatial autocorrelation characteristic.

In an example, in a process of obtaining the target algorithm based on the first parameter of the prediction space, whether the prediction space has the global spatial autocorrelation characteristic is determined through the following operations:

if the first parameter of the prediction space is greater than a first preset threshold, the prediction space has the global spatial autocorrelation characteristic; or if the first parameter of the prediction space is not greater than the first preset threshold, the prediction space does not have the global spatial autocorrelation characteristic.

In an embodiment, the first algorithm includes any method in a Kriging method cluster or a BHM algorithm, and the obtaining a first algorithm includes:

determining whether the wireless signal received strength of the S first sampling points meets preset probability distribution; and determining the BHM algorithm as the first algorithm if the wireless signal received strength of the S first sampling points meets the preset probability distribution; or determining any method in the Kriging method cluster as the first algorithm if the wireless signal received strength of the S first sampling points does not meet the preset probability distribution.

In an embodiment, the preset probability distribution may be normal distribution, Poisson distribution, binomial distribution, Gaussian distribution, or other probability distribution.

Further determining is performed according to the above method, and a more suitable algorithm can be selected for the prediction space. This improves precision of a wireless signal propagation model generated based on the algorithm, and further improves accuracy of obtaining wireless signal received strength of the terminal at any location in the prediction space based on the wireless signal propagation model.

In an embodiment, the second algorithm includes a machine learning algorithm, any method in a B-shade method cluster, any method in an MSN method cluster, or a stratified Kriging algorithm, and the obtaining a second algorithm includes:

performing area division on the prediction space to obtain a plurality of target areas; and determining the stratified Kriging algorithm as the second algorithm when each of the plurality of target areas meets a preset condition; or obtaining a third algorithm and determining the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and the determining the stratified Kriging algorithm as the second algorithm when each of the plurality of target areas meets a preset condition includes:

determining the stratified Kriging algorithm as the second algorithm when each of the plurality of target areas simultaneously meets the first preset condition, the second preset condition, and the third preset condition; and the obtaining a third algorithm when any one of the plurality of target areas does not meet the preset condition includes:

determining the machine learning algorithm as the third algorithm when any one of the plurality of target areas does not meet the first preset condition; or determining any method in the B-shade method cluster as the third algorithm when any one of the plurality of target areas meets the first preset condition but does not meet the second preset condition; or determining any method in the MSN method cluster as the third algorithm when any one of the plurality of target areas meets the first preset condition and the second preset condition but does not meet the third preset condition.

Further determining is performed according to the above method, and a more suitable algorithm can be selected for the prediction space. This improves precision of a wireless signal propagation model generated based on the algorithm, and further improves accuracy of obtaining wireless signal received strength of the terminal at any location in the prediction space based on the wireless signal propagation model.

In an embodiment, the first preset condition includes that the target area has a global spatial autocorrelation characteristic; the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, the performing area division on the prediction space to obtain a plurality of target areas includes:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter is used to indicate a significance degree of spatial stratified heterogeneity of areas obtained by performing area division on the prediction space, and a larger value of the second parameter indicates a higher significance degree of the spatial stratified heterogeneity of the areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold, where T dimension indicators used for any time of area division on the prediction space partially intersect or do not intersect with T dimension indicators used for any other time of area division on the prediction space.

The T dimension indicators include a visible area and an invisible area, building information (for example, a building type, a geometric size, and a construction age), a terrain classification, a city function, and the like.

According to a second aspect, an embodiment of this application provides another wireless signal propagation prediction method, and the method includes:

obtaining one or more second areas when precision of a first wireless signal propagation model is lower than a prediction precision expectation, where an absolute value of a difference between a predicted value of wireless signal received strength of a terminal in the second area and a check value is greater than a second preset threshold, the predicted value of the wireless signal received strength is obtained through prediction by using the first wireless signal propagation model, and the first wireless signal propagation model is generated based on location information of S first sampling points and corresponding wireless signal received strength; obtaining N second sampling points, and generating a target wireless signal propagation model based on location information of the S first sampling points and the N second sampling points and corresponding wireless signal received strength, where location information of any one of the N second sampling points is different from location information of each of the S first sampling points, each of the N second sampling points is located in the second area, and N is an integer greater than 0; and obtaining wireless signal received strength of the terminal at any location in prediction space based on the target wireless signal propagation model.

In an embodiment, the check data may be drive test data, data reported by the terminal, or data in another form.

When the precision of the wireless signal propagation model is lower than the prediction precision expectation, a plurality of sampling points are added, and then a new wireless signal propagation model is regenerated based on the plurality of newly added sampling points and the sampling points used for generating the wireless signal propagation model. This improves precision of the wireless signal propagation model, and further improves prediction precision for wireless signal received strength.

In an embodiment, the obtaining N second sampling points, and generating a target wireless signal propagation model based on location information of the S first sampling points and the N second sampling points and corresponding wireless signal received strength includes:

S10: obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20: performing random disturbance processing on the $N_i$ initial sampling points to obtain $N_i$ reference sampling points;

S30: generating a wireless signal propagation model $M_i$ based on a preset algorithm, the location information of the S first sampling points and the N second sampling points, and the corresponding wireless signal received strength, where the N second sampling points include a target sampling point set and the $N_i$ reference sampling points, and i is an integer greater than 0; and S40: determining whether the wireless signal propagation model $M_i$ meets a first convergence condition and a second convergence condition; and repeating operations S20 to S40 when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model $M_i$ meets the second convergence condition, where the second convergence condition is different from the first convergence condition, and when i=1, the target sampling point set is an empty set.

In an embodiment, the obtaining N second sampling points, and generating a target wireless signal propagation model based on location information of the S first sampling points and the N second sampling points and corresponding wireless signal received strength includes:

S10': obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength, where the N second sampling points include a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition, where the second convergence condition is different from the first convergence condition, and when i=1, the sampling point set $A_{i-1}$ is an empty set.

In an embodiment, the obtaining $N_i$ initial sampling points includes:

obtaining a plurality of first reference sampling point sets, where sampling points in the plurality of first reference sampling point sets are all located in the second area;

obtaining a plurality of second reference sampling point sets based on the plurality of first reference sampling point sets and the S first sampling points, where sampling points in a $j^{th}$ second reference sampling point set in the plurality of second reference sampling point sets include the S first sampling points and a sampling point in a $j^{th}$ first reference sampling point set in the plurality of first reference sampling point sets; generating a plurality of reference wireless signal propagation models based on location information of a sampling point in each of the plurality of second reference sampling point sets and corresponding wireless signal received strength, where the plurality of reference wireless signal propagation models are in a one-to-one correspondence with the plurality of second reference sampling point sets; obtaining an error value of each of the plurality of reference wireless signal propagation models through calculation based on check data; and obtaining the $N_i$ initial sampling points based on the error value, where the $N_i$ initial sampling points are sampling points other than the S first sampling points in a second reference sampling point set corresponding to a smallest error value.

In an embodiment, the preset algorithm is an algorithm used when a reference wireless signal propagation model corresponding to the smallest error value is generated.

It should be noted herein that, for a specific implementation process of generating the plurality of reference wireless signal propagation models based on the location information of the sampling point in each of the plurality of second reference sampling point sets and the corresponding wireless signal received strength, refer to related descriptions of the method in the first aspect. Details are not described herein again.

In an embodiment, that the first wireless signal propagation model is generated based on location information of S first sampling points and corresponding wireless signal received strength includes:
  calculating a first parameter of the prediction space based on the location information of the S first sampling points and the corresponding wireless signal received strength, and obtaining an algorithm C based on the first parameter of the prediction space, where the first parameter is used to indicate a degree of a global spatial autocorrelation characteristic of the prediction space; and generating the first wireless signal receiving model W based on the algorithm C, the location information of the S first sampling points, and the corresponding wireless signal received strength.

In an embodiment, the obtaining an algorithm C based on the first parameter of the prediction space includes:
  obtaining a first algorithm and determining the first algorithm as the algorithm C when determining, based on the first parameter, that the prediction space has the global spatial autocorrelation characteristic; or obtaining a second algorithm and determining the second algorithm as the algorithm C when determining, based on the first parameter, that the prediction space does not have the global spatial autocorrelation characteristic.

In an embodiment, the first algorithm includes a Bayesian hierarchical model BHM algorithm or any method in a Kriging method cluster, and the obtaining a first algorithm includes:
  determining the BHM algorithm as the first algorithm when the wireless signal received strength of the S first sampling points meets preset probability distribution; or determining any method in the Kriging method cluster as the first algorithm when the wireless signal received strength of the S first sampling points does not meet the preset probability distribution.

In an embodiment, the preset probability distribution may be normal distribution, Poisson distribution, binomial distribution, Gaussian distribution, or other probability distribution.

Further determining is performed according to the above method, and a more suitable algorithm can be selected for the prediction space. This improves precision of a wireless signal propagation model generated based on the algorithm, and further improves accuracy of obtaining wireless signal received strength of the terminal at any location in the prediction space based on the wireless signal propagation model.

In an embodiment, the second algorithm includes a machine learning algorithm, any method in a B-shade method cluster, any method in an MSN method cluster, or a stratified Kriging algorithm, and the obtaining a second algorithm includes:
  performing area division on the prediction space to obtain a plurality of target areas; determining whether each of the plurality of target areas meets a preset condition; and determining the stratified Kriging algorithm as the second algorithm when each of the plurality of target areas meets the preset condition; or obtaining a third algorithm and determining the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and the determining the stratified Kriging algorithm as the second algorithm when each of the plurality of target areas meets the preset condition includes:
  determining the stratified Kriging algorithm as the second algorithm when each of the plurality of target areas simultaneously meets the first preset condition, the second preset condition, and the third preset condition; and
  the obtaining a third algorithm when any one of the plurality of target areas does not meet the preset condition includes:
  determining the machine learning algorithm as the third algorithm when any one of the plurality of target areas does not meet the first preset condition; or
  determining any method in the B-shade method cluster as the third algorithm when any one of the plurality of target areas meets the first preset condition but does not meet the second preset condition; or
  determining any method in the MSN method cluster as the third algorithm when any one of the plurality of target areas meets the first preset condition and the second preset condition but does not meet the third preset condition.

Further determining is performed according to the above method, and a more suitable algorithm can be selected for the prediction space. This improves precision of a wireless signal propagation model generated based on the algorithm, and further improves accuracy of obtaining wireless signal received strength of the terminal at any location in the prediction space based on the wireless signal propagation model.

In an embodiment, the first preset condition includes that the target area has a global spatial autocorrelation characteristic;
  the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, the performing area division on the prediction space to obtain a plurality of target areas includes:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter is used to indicate a significance degree of spatial stratified heterogeneity of areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold, where T dimension indicators used for any time of area division on the prediction space partially intersect or do not intersect with T dimension indicators used for any other time of area division on the prediction space.

The T dimension indicators include a visible area and an invisible area, building information (for example, a building type, a geometric size, and a construction age), a terrain classification, a city function, and the like.

According to a third aspect, an embodiment of this application provides a wireless signal propagation prediction apparatus, including:

a memory, configured to store instructions; and a processor, coupled to the memory.

When executing the instructions, the processor performs the following method:

obtaining location information of each of S first sampling points in prediction space and wireless signal received strength of a terminal at a location indicated by the location information, where S is an integer greater than 1; obtaining a first parameter of the prediction space through calculation based on location information of the S first sampling points and corresponding wireless signal received strength, where the first parameter is used to indicate a degree of a global spatial autocorrelation characteristic of the prediction space; obtaining a target algorithm based on the first parameter, and generating a wireless signal propagation model of the prediction space based on the target algorithm, the location information of the S first sampling points, and the corresponding wireless signal received strength; and obtaining wireless signal received strength of the terminal at any location in the prediction space based on the wireless signal propagation model of the prediction space.

In an embodiment, in an aspect of obtaining a target algorithm based on the first parameter of the prediction space, the processor is configured to:

obtain a first algorithm and determine the first algorithm as the target algorithm when determining, based on the first parameter, that the prediction space has the global spatial autocorrelation characteristic; or obtain a second algorithm and determine the second algorithm as the target algorithm when determining, based on the first parameter, that the prediction space has the global spatial autocorrelation characteristic.

In an example, in a process of obtaining the target algorithm based on the first parameter of the prediction space, whether the prediction space has the global spatial autocorrelation characteristic is determined through the following operations:

if the first parameter of the prediction space is greater than a first preset threshold, the prediction space has the global spatial autocorrelation characteristic; or if the first parameter of the prediction space is not greater than the first preset threshold, the prediction space does not have the global spatial autocorrelation characteristic.

In an embodiment, the first algorithm includes any method in a Kriging method cluster or a BHM algorithm, and in an aspect of obtaining a first algorithm, the processor is configured to:

determine whether the wireless signal received strength of the S first sampling points meets preset probability distribution; and determine the BHM algorithm as the first algorithm if the wireless signal received strength of the S first sampling points meets the preset probability distribution; or determine any method in the Kriging method cluster as the first algorithm if the wireless signal received strength of the S first sampling points does not meet the preset probability distribution.

In an embodiment, the second algorithm includes a machine learning algorithm, any method in a B-shade method cluster, any method in an MSN method cluster, or a stratified Kriging algorithm, and in an aspect of obtaining a second algorithm, the processor is configured to:

perform area division on the prediction space to obtain a plurality of target areas; and determine the stratified Kriging algorithm as the second algorithm when each of the plurality of target areas meets a preset condition; or obtain a third algorithm and determine the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and in an aspect of determining the stratified Kriging algorithm as the second algorithm when each of the plurality of target areas meets a preset condition, the processor is configured to:

determine the stratified Kriging algorithm as the second algorithm when each of the plurality of target areas simultaneously meets the first preset condition, the second preset condition, and the third preset condition; and the obtaining a third algorithm when any one of the plurality of target areas does not meet the preset condition includes:

determining the machine learning algorithm as the third algorithm when any one of the plurality of target areas does not meet the first preset condition; or determining any method in the B-shade method cluster as the third algorithm when any one of the plurality of target areas meets the first preset condition but does not meet the second preset condition; or determining any method in the MSN method cluster as the third algorithm when any of the plurality of target areas meets the first preset condition and the second preset condition but does not meet the third preset condition.

In an embodiment, the first preset condition includes that the target area has a global spatial autocorrelation characteristic; the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, in an aspect of performing area division on the prediction space to obtain a plurality of target areas, the processor is configured to perform the following operations:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter is used to indicate a significance degree of spatial stratified heterogeneity of areas obtained by performing area division on the prediction space, and a larger value of the second parameter indicates a higher significance degree of the spatial stratified heterogeneity of the areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold, where T dimension indicators used for any time of area division on the prediction space partially intersect or do not intersect with T dimension indicators used for any other time of area division on the prediction space.

According to a fourth aspect, an embodiment of this application provides another wireless signal propagation prediction apparatus, including:

a memory configured to store instructions; and
a processor, coupled to the memory.

When executing the instructions, the processor performs the following method:

obtaining one or more second areas when precision of a first wireless signal propagation model is lower than a prediction precision expectation, where an absolute value of a difference between a predicted value of wireless signal received strength of a terminal in the second area and a check value is greater than a second preset threshold, the predicted value of the wireless signal received strength is obtained through prediction by using the first wireless signal propagation model, and the first wireless signal propagation model is generated based on location information of S first sampling points and corresponding wireless signal received strength; obtaining N second sampling points, and generating a target wireless signal propagation model based on location information of the S first sampling points and the N second sampling points and corresponding wireless signal received strength, where location information of any one of the N second sampling points is different from location information of each of the S first sampling points, each of the N second sampling points is located in the second area, and N is an integer greater than 0; and obtaining wireless signal received strength of the terminal at any location in prediction space based on the target wireless signal propagation model.

In an embodiment, in an aspect of obtaining N second sampling points, and generating a target wireless signal propagation model based on location information of the S first sampling points and the N second sampling points and corresponding wireless signal received strength, the processor is configured to perform the following operations:

S10: obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20: performing random disturbance processing on the $N_i$ initial sampling points to obtain $N_i$ reference sampling points;

S30: generating a wireless signal propagation model $M_i$ based on a preset algorithm, the location information of the S first sampling points and the N second sampling points, and the corresponding wireless signal received strength, where the N second sampling points include a target sampling point set and the $N_i$ reference sampling points, and i is an integer greater than 0; and S40: determining whether the wireless signal propagation model $M_i$ meets a first convergence condition and a second convergence condition; and repeating operations S20 to S40 when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model $M_i$ meets the second convergence condition, where the second convergence condition is different from the first convergence condition, and when i=1, the target sampling point set is an empty set.

In an embodiment, in an aspect of obtaining N second sampling points, and generating a target wireless signal propagation model based on location information of the S first sampling points and the N second sampling points and corresponding wireless signal received strength, the processor is configured to perform the following operations:

S10': obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength, where the N second sampling points include a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition.

The second convergence condition is different from the first convergence condition, and when i=1, the sampling point set $A_{i-1}$ is an empty set.

In an embodiment, in an aspect of obtaining $N_i$ initial sampling points, the processor is configured to:
  obtain a plurality of first reference sampling point sets, where sampling points in the plurality of first reference sampling point sets are all located in the second area; and
  obtain a plurality of second reference sampling point sets based on the plurality of first reference sampling point sets and the S first sampling points, where sampling points in a $j^{th}$ second reference sampling point set in the plurality of second reference sampling point sets include the S first sampling points and a sampling point in a $j^{th}$ first reference sampling point set in the plurality of first reference sampling point sets; generate a plurality of reference wireless signal propagation models based on location information of a sampling point in each of the plurality of second reference sampling point sets and corresponding wireless signal received strength, where the plurality of reference wireless signal propagation models are in a one-to-one correspondence with the plurality of second reference sampling point sets; obtain an error value of each of the plurality of reference wireless signal propagation models through calculation based on the check data; and obtain the $N_i$ initial sampling points based on the error value, where the $N_i$ initial sampling points are sampling points other than the S first sampling points in a second reference sampling point set corresponding to a smallest error value.

In an embodiment, the preset algorithm is an algorithm used when a reference wireless signal propagation model corresponding to the smallest error value is generated.

In an embodiment, when the first wireless signal propagation model is generated based on the location information of the S first sampling points and the corresponding wireless signal received strength, the processor is configured to:
  calculate a first parameter of the prediction space based on location information of a plurality of sampling points and corresponding wireless signal received strength; obtain an algorithm C based on the first parameter of the prediction space, where the first parameter indicates a degree of a global spatial autocorrelation characteristic of the prediction space; and generate a wireless signal receiving model W based on the algorithm C, location information of a sampling point in a sampling point set, and corresponding wireless signal received strength, where when the plurality of sampling points are the S first sampling points, the wireless signal propagation model W is a first wireless signal propagation model, or when the plurality of sampling points are sampling points in the $j^{th}$ second reference sampling point set in the plurality of second reference sampling point sets, the wireless signal propagation model W is a $j^{th}$ reference wireless signal propagation model in the plurality of reference wireless signal propagation models.

In an embodiment, in an aspect of obtaining an algorithm C based on the first parameter of the prediction space, the processor is configured to:
  obtain a first algorithm and determine the first algorithm as the algorithm C when determining, based on the first parameter, that the prediction space has the global spatial autocorrelation characteristic; or obtain a second algorithm and determine the second algorithm as the algorithm C when determining, based on the first parameter, that the prediction space does not have the global spatial autocorrelation characteristic.

In an embodiment, the first algorithm includes a Bayesian hierarchical model BHM algorithm or any method in a Kriging method cluster, and the obtaining a first algorithm includes:
  determining the BHM algorithm as the first algorithm when the wireless signal received strength of the S first sampling points meets preset probability distribution; or determining any method in the Kriging method cluster as the first algorithm when the wireless signal received strength of the S first sampling points does not meet the preset probability distribution.

In an embodiment, the preset probability distribution may be normal distribution, Poisson distribution, binomial distribution, Gaussian distribution, or other probability distribution.

In an embodiment, the second algorithm includes a machine learning algorithm, any method in a B-shade method cluster, any method in an MSN method cluster, or a stratified Kriging algorithm, and in an aspect of obtaining a second algorithm, the processor is configured to:
  perform area division on the prediction space to obtain a plurality of target areas; determine whether each of the plurality of target areas meets a preset condition; and determine the stratified Kriging algorithm as the second algorithm when each of the plurality of target areas meets the preset condition; or obtain a third algorithm and determine the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and in an aspect of determining the stratified Kriging algorithm as the second algorithm when each of the plurality of target areas meets the preset condition, the processor is specifically configured to:
  determine the stratified Kriging algorithm as the second algorithm when each of the plurality of target areas simultaneously meets the first preset condition, the second preset condition, and the third preset condition; and the obtaining a third algorithm when any one of the plurality of target areas does not meet the preset condition includes:
determining the machine learning algorithm as the third algorithm when any one of the plurality of target areas does not meet the first preset condition; or
determining any method in the B-shade method cluster as the third algorithm when any one of the plurality of target areas meets the first preset condition but does not meet the second preset condition; or
determining any method in the MSN method cluster as the third algorithm when any one of the plurality of target areas meets the first preset condition and the second preset condition but does not meet the third preset condition.

In an embodiment, the first preset condition includes that the target area has a global spatial autocorrelation characteristic; and
the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, in an aspect of performing area division on the prediction space to obtain a plurality of target areas, the processor is configured to perform the following operations:
S1: performing area division on the prediction space based on T dimension indicators, to obtain a plurality of first areas, where any one of the plurality of first areas meets some or all of the T dimension indicators;
S2: obtaining a second parameter through calculation based on the plurality of first areas and a geodetector algorithm, where the second parameter is used to indicate a significance degree of spatial stratified heterogeneity of areas obtained by performing area division on the prediction space; and
S3: repeating S1 to S3 when the second parameter is not greater than a first preset threshold, until the second parameter is greater than the first preset threshold; or determining the plurality of first areas as the plurality of target areas when the second parameter is greater than the first preset threshold.
T dimension indicators used for any time of area division on the prediction space partially intersect or do not intersect with T dimension indicators used for any other time of area division on the prediction space.

According to a fifth aspect, an embodiment of this application provides a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor, where the signal includes computer instructions stored in the memory. When the processor executes the computer instructions, the electronic device performs a part or all of the method in the first aspect or the second aspect.

According to a sixth aspect, an embodiment of this application provides a computer-readable storage medium. The computer storage medium stores a computer program. The computer program includes program instructions. When the program instructions are executed by a processor, the processor is enabled to perform a part or all of the method in the first aspect or the second aspect.

According to a seventh aspect, an embodiment of this application provides a computer program product. The computer program product includes computer instructions. When the computer instructions are run on an electronic device, the electronic device is enabled to perform a part or all of the method in the first aspect or the second aspect.

These aspects or other aspects of this application are clearer and more comprehensible in descriptions of the following embodiments.

BRIEF DESCRIPTION OF DRAWINGS

To describe the technical solutions in embodiments of this application or in the conventional technology more clearly, the following briefly introduces the accompanying drawings for describing embodiments or the conventional technology. It is clear that the accompanying drawings in the following descriptions show only some embodiments of this application, and a person of ordinary skill in the art may still derive other drawings from these accompanying drawings without creative efforts.

DESCRIPTION OF EMBODIMENTS

The following describes embodiments of this application with reference to the accompanying drawings.

FIG. T a is a schematic diagram of an application scenario according to an embodiment of this application. As shown in FIG. Ta, in this application scenario, there is a base station 101, a terminal 102, and a prediction apparatus 103.

The base station 101 may be a macro base station, a micro base station, a picocell base station, a remote radio unit, a repeater, or the like. The terminal 102 is an apparatus with a communication function, and may be a smartphone, a notebook computer, a tablet computer, an intelligent wearable device (such as a smart band, a smart watch, and smart glasses), an internet of things device, or the like.

Figure 1A:
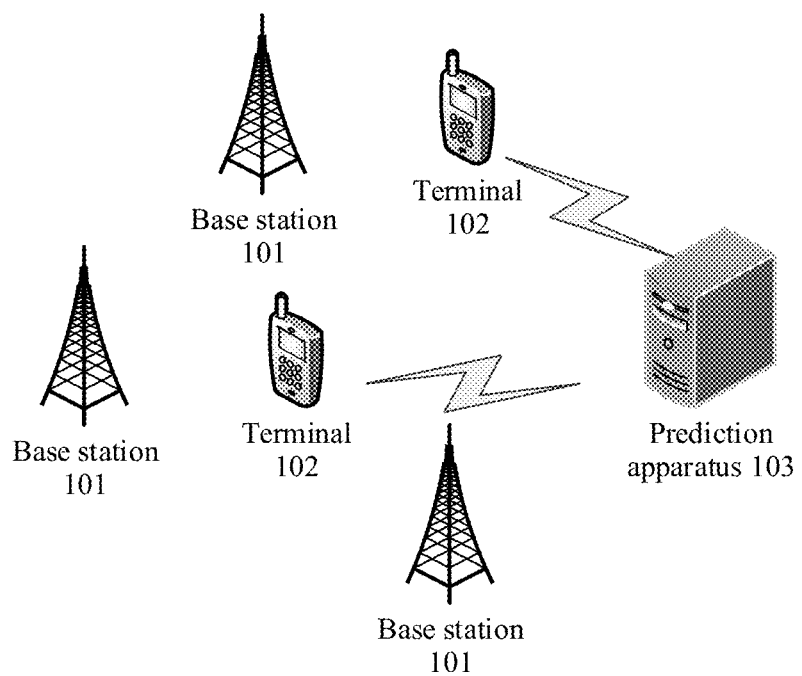
FIG. 1a is a schematic diagram of an application scenario according to an embodiment of this application.
Figure 1B:
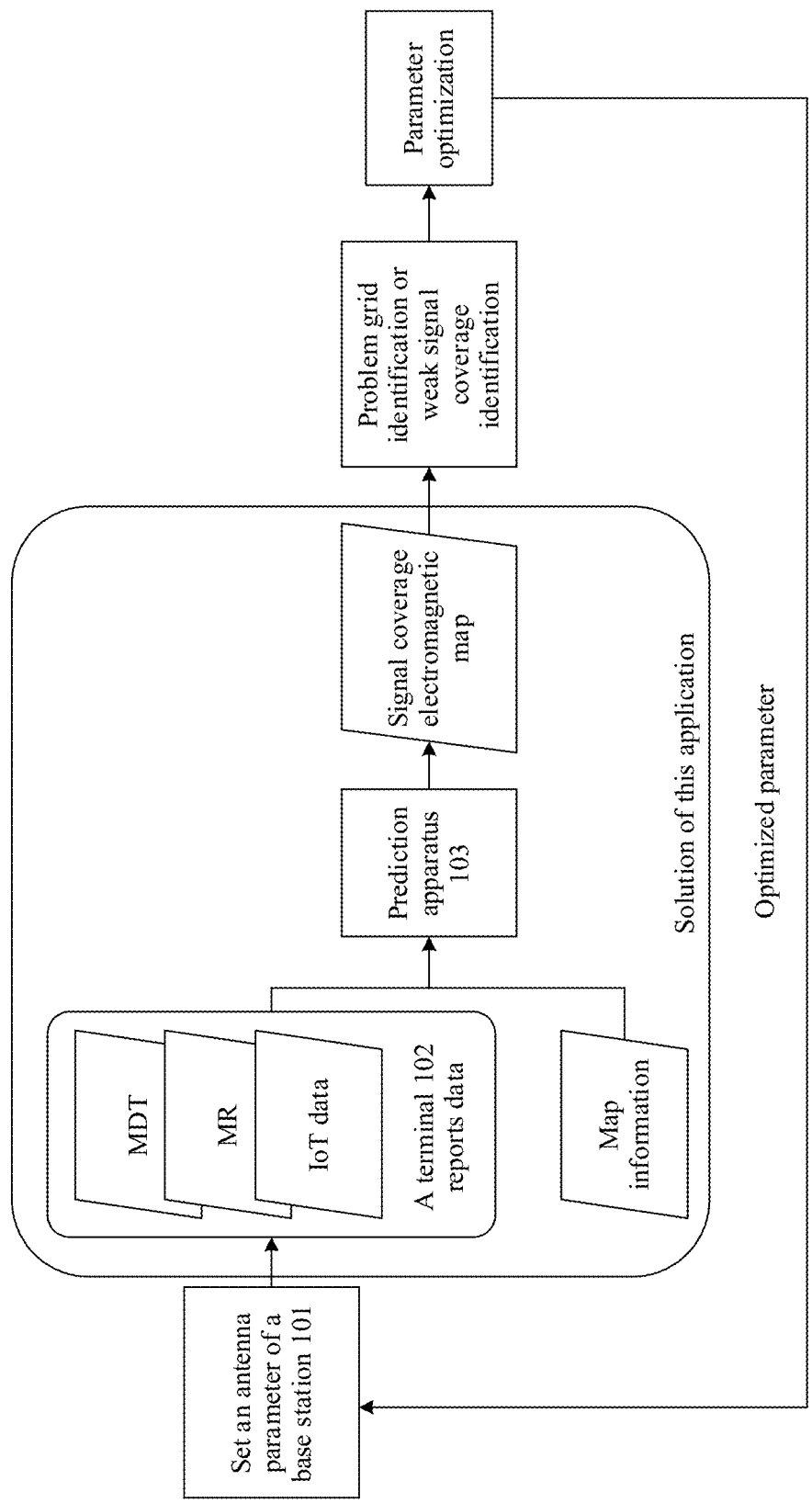
FIG. 1b is a schematic diagram of another application scenario according to an embodiment of this application.

As shown in FIG. 1*b*, the prediction apparatus 103 obtains wireless signal received strength and location information of a plurality of terminals 102 located in a coverage area of the base station 101. For example, the wireless signal received strength and the location information may be obtained from data that is reported by the terminal 102 and carries location information of the terminal and wireless signal received strength of the terminal 102 at a location indicated by the location information, such as a minimization of drive tests (MDT) result, a measurement report (MR), internet of things (IoT) data, or data obtained by a drive test device through sampling. Then, the prediction apparatus 103 obtains a target algorithm based on the wireless signal received strength and the location of the plurality of terminals 102 and map information, and generates a wireless signal propagation model based on the target algorithm and the obtained wireless signal received strength and location information, that is, a signal coverage electromagnetic map shown in FIG. 1*b*.

Subsequently, network planning personnel or a network planning apparatus identifies a problem grid or a weak signal coverage area based on the obtained wireless signal propagation model, then performs a parameter optimization operation for the problem grid or the weak signal coverage area to obtain optimized parameters, and sets antenna parameters of the base station 101, such as an uptilt angle, a downtilt angle, and a transmit power of a base station antenna, based on the optimized parameters. The foregoing method is repeated to continuously optimize the antenna parameters of the base station 101, so that the base station 101 achieves a good signal coverage effect.

Figure 2A:
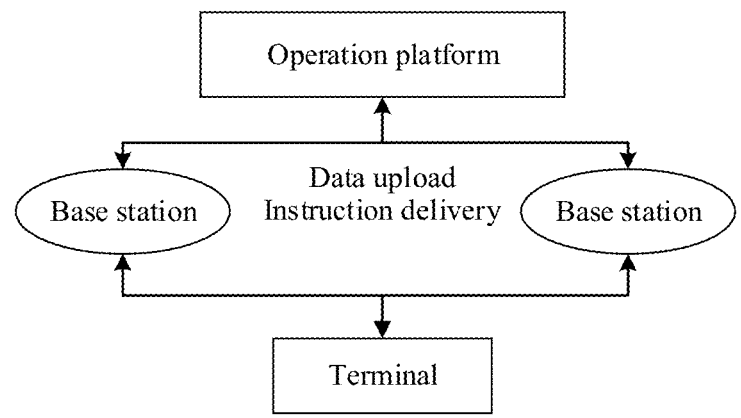
FIG. 2a is a schematic diagram of a system architecture according to an embodiment of this application.

The following describes schematic diagrams of two system architectures according to embodiments of this application. As shown in FIG. 2*a*, a terminal uploads, to an operation platform through a base station, data that carries location information and wireless signal received strength of the terminal at a location indicated by the location information, such as an MDT result, an MR, or IoT data. The operation platform obtains a target interpolation algorithm based on the received location information and corresponding wireless signal received strength, and map data, and generates a wireless signal propagation model based on the target algorithm and the obtained wireless signal received strength and location information. The operation platform identifies a problem grid or a weak signal coverage area based on the obtained wireless signal propagation model, then performs a parameter optimization operation for the problem grid or the weak signal coverage area to obtain optimized parameters, and sends an instruction carrying the optimized parameters to the base station to control the base station to adjust antenna parameters of the base station based on the optimized parameters. The foregoing operations are repeated to achieve an objective of optimizing wireless signal coverage of the base station.

Figure 2B:
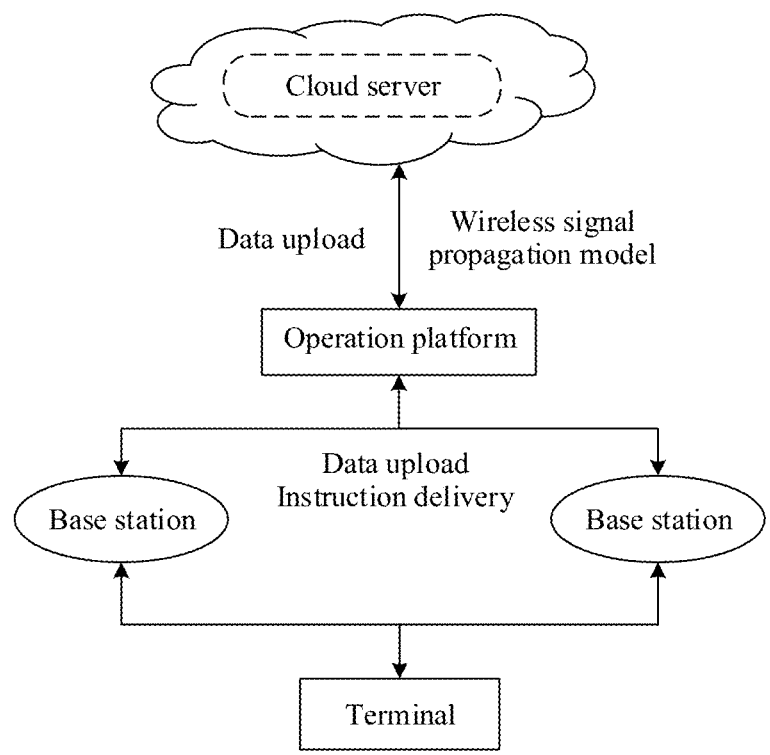
FIG. 2b is a schematic diagram of another system architecture according to an embodiment of this application.

As shown in FIG. 2*b*, a terminal uploads, to an operation platform through a base station, data that carries location information and wireless signal received strength of the terminal at a location indicated by the location information, such as an MDT result, an MR, or IoT data. The operation platform uploads the received location information and corresponding wireless signal received strength to a cloud server. The cloud server obtains a target algorithm based on the received location information and corresponding wireless signal received strength, and map data, generates a wireless signal propagation model based on the target algorithm and the obtained wireless signal received strength and location information, and sends the wireless signal propagation model to the operation platform. The operation platform identifies a problem grid or a weak signal coverage area based on the obtained wireless signal propagation model, performs a parameter optimization operation for the problem grid or the weak signal coverage area to obtain optimized parameters, and sends an instruction carrying the optimized parameters to the base station to control the base station to adjust antenna parameters of the base station based on the optimized parameters. The foregoing operations are repeated to achieve an objective of optimizing wireless signal coverage of the base station.

The following describes a specific process of predicting wireless signal propagation by the prediction apparatus, the operation platform, or the cloud server.

Figure 3:
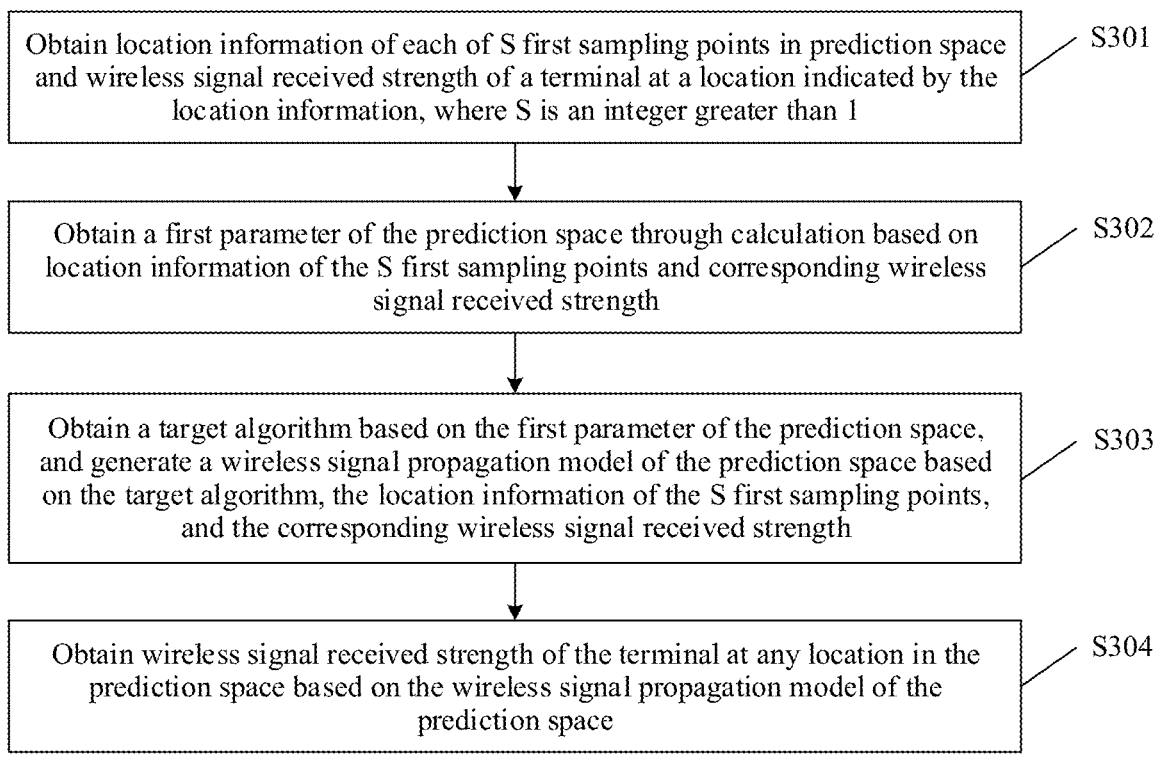
FIG. 3 is a schematic flowchart of a wireless signal propagation prediction method according to an embodiment of this application.

FIG. 3 is a schematic flowchart of a wireless signal propagation prediction method according to an embodiment of this application. As shown in FIG. 3, the method includes the following operations.

S301: Obtain location information of each of S first sampling points in prediction space and wireless signal received strength of a terminal at a location indicated by the location information, where S is an integer greater than 1.

The wireless signal received strength and location information may be obtained from data that is reported by the terminal 102 and that carries location information of the terminal and wireless signal received strength of the terminal 102 at a location indicated by the location information, such as an MDT result, an MR, IoT data, or data obtained by a drive test device through random sampling.

In an embodiment, the location information may be coordinates, or may be grid information indicating a location.

S302: Obtain a first parameter of the prediction space through calculation based on location information of the S first sampling points and corresponding wireless signal received strength.

The first parameter of the prediction space indicates a degree of a global spatial autocorrelation characteristic of the prediction space. A larger value of the first parameter indicates a higher degree of the global spatial autocorrelation characteristic of the prediction space.

Specifically, calculation is performed for the location information of the S first sampling points and the corresponding wireless signal received strength based on a preset algorithm, to obtain the first parameter of the prediction space. In an embodiment, the preset algorithm may be a Moran's I algorithm, a spatial autocorrelation y (Gamma) index algorithm, a join count statistics algorithm, a Geary's C algorithm, a Getis G algorithm, an Ord's G algorithm, or the like.

Figure 3A:
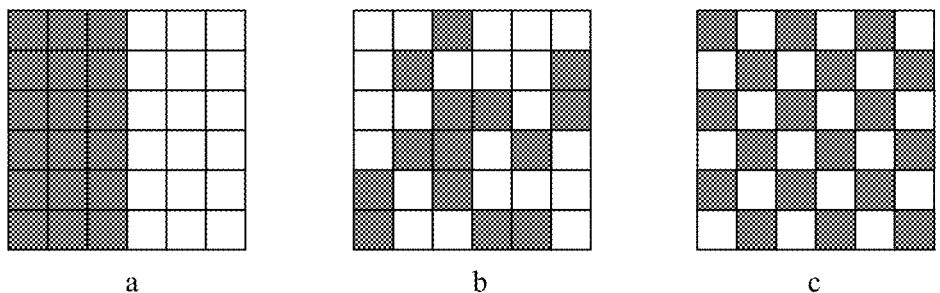
FIG. 3a is a schematic diagram of blocks with and without a global spatial autocorrelation characteristic.

As shown in a in FIG. 3*a*, gray blocks have a global spatial autocorrelation characteristic, and blocks shown in b and c in FIG. 3*a* each do not have the global spatial autocorrelation characteristic.

S303: Obtain a target algorithm based on the first parameter of the prediction space, and generate a wireless signal propagation model of the prediction space based on the target algorithm, the location information of the S first sampling points, and the corresponding wireless signal received strength.

In an embodiment, whether the prediction space has the global spatial autocorrelation characteristic is determined based on a value relationship between the first parameter of the prediction space and a third preset threshold; and when the first parameter of the prediction space is less than the third preset threshold, it is determined that the prediction space does not have the global spatial autocorrelation characteristic; or when the first parameter of the prediction space is not less than the third preset threshold, it is determined that the prediction space has the global spatial autocorrelation characteristic.

In an embodiment, a value range of the first parameter is [−1, 1]. When the first parameter falls within a first interval, it is determined that the prediction space has the global spatial autocorrelation characteristic. When the first parameter falls within a second interval, it is determined that the prediction space does not have the global spatial autocorrelation characteristic. The first interval and the second interval have no intersection. For example, the first interval may be [0.3, 1], and the second interval is [−1, 0.3).

In an embodiment, when it is determined, based on the first parameter of the prediction space, that the prediction space has the global spatial autocorrelation characteristic, a first algorithm is obtained, and the first algorithm is determined as the target algorithm; or when it is determined, based on the first parameter of the prediction space, that the prediction space does not have the global spatial autocorrelation characteristic, a second algorithm is obtained, and the second algorithm is determined as the target algorithm.

In an embodiment, the first algorithm includes a Bayesian hierarchical model (BHM) algorithm or any method in a Kriging method cluster, and the second algorithm includes a machine learning algorithm, any method in a biased sentinel hospital area disease estimation (B-shade) method cluster, any method in a means of surface with non-homogeneity (MSN) method cluster, or a stratified Kriging algorithm.

The foregoing Kriging method cluster includes a series of evolved algorithms, such as ordinary Kriging, universal Kriging, co-Kriging, disjunctive Kriging, and some hybrid algorithms combined with other algorithms, such as regression-Kriging, neural Kriging, and Bayesian Kriging.

In an embodiment, the second algorithm includes a machine learning algorithm, any method in a B-shade method cluster, any method in an MSN method cluster, or a stratified Kriging algorithm, and obtaining the second algorithm includes:

performing area division on the prediction space to obtain a plurality of target areas; and determining the stratified Kriging algorithm as the second algorithm when each of the plurality of target areas meets a preset condition; or obtaining a third algorithm and determining the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and the determining the stratified Kriging algorithm as the second algorithm when each of the plurality of target areas meets a preset condition includes:

determining the stratified Kriging algorithm as the second algorithm when each of the plurality of target areas simultaneously meets the first preset condition, the second preset condition, and the third preset condition; and the obtaining a third algorithm when any one of the plurality of target areas does not meet the preset condition includes:

determining the machine learning algorithm as the third algorithm when any one of the plurality of target areas does not meet the first preset condition; or determining any method in the B-shade method cluster as the third algorithm when any one of the plurality of target areas meets the first preset condition but does not meet the second preset condition; or determining any method in the MSN method cluster as the third algorithm when any one of the plurality of target areas meets the first preset condition and the second preset condition but does not meet the third preset condition.

In an embodiment, the first preset condition includes that the target area has a global spatial autocorrelation characteristic; the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

Figure 4:
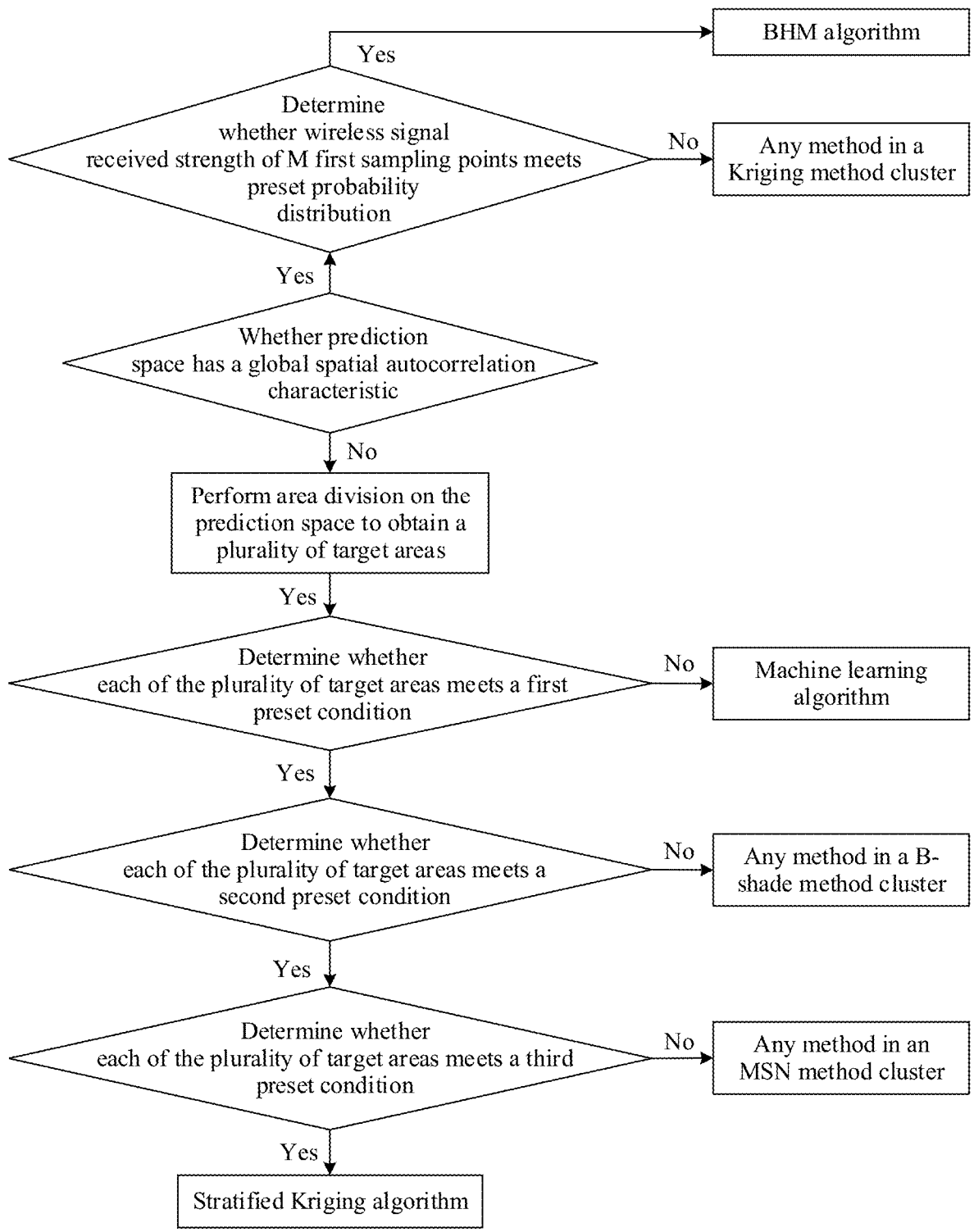
FIG. 4 is a schematic flowchart of obtaining a target interpolation algorithm.

Specifically, as shown in FIG. 4, when it is determined, based on the first parameter of the prediction space, that the prediction space has the global spatial autocorrelation characteristic, whether the wireless signal received strength of the S first sampling points meets preset probability distribution is determined. In an example, whether the wireless signal received strength of the S first sampling points meets the preset probability distribution may be determined based on prior knowledge. If the wireless signal received strength of the S first sampling points meets the preset probability distribution, the BHM algorithm is determined as the first algorithm; or if the wireless signal received strength of the S first sampling points does not meet the preset probability distribution, any method in the Kriging method cluster is determined as the first algorithm.

In an embodiment, the preset probability distribution may be statistical distribution, such as normal distribution, Poisson distribution, binomial distribution, or Gaussian distribution, or may be spatial distribution.

Further, when it is determined, based on the first parameter, that the prediction space does not have the global spatial autocorrelation characteristic, area division is performed on the prediction space to obtain a plurality of target areas.

In an embodiment, performing area division on the prediction space to obtain a plurality of target areas includes:

performing area division on the prediction space based on T dimension indicators, to obtain the plurality of target areas.

It should be noted herein that the performing area division on the prediction space to obtain a plurality of target areas may be performing area division on a map of the prediction space to obtain a plurality of target areas.

In an embodiment, the map of the prediction space may be a two-dimensional map, or may be a three-dimensional map. When the map of the prediction space is a two-dimensional map, the location information in this embodiment of this application is two-dimensional location information, for example, two-dimensional coordinates. When the map of the prediction space is a three-dimensional map, the location information in this embodiment of this application is three-dimensional location information, for example, three-dimensional coordinates.

In an embodiment, in an example, area division is performed on the prediction space based on T dimension indicators separately to obtain T first division maps, where the T first division maps are in a one-to-one correspondence with the T dimension indicators. Area boundary lines in the T first division maps are superimposed to obtain the plurality of target areas.

Figure 5:
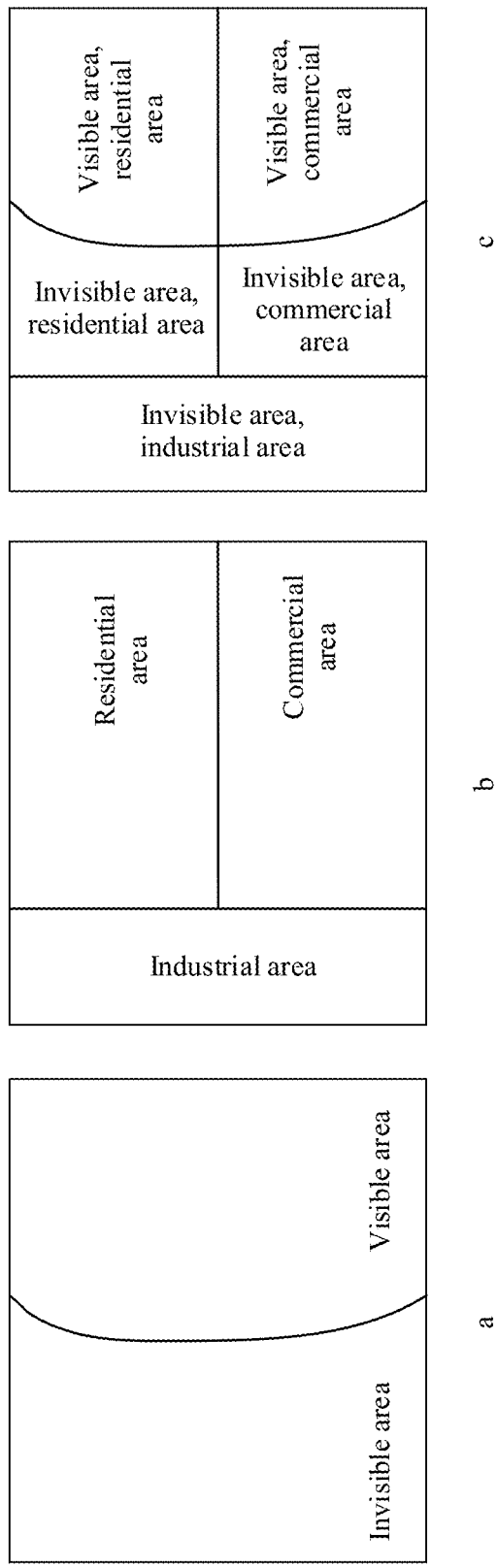
FIG. 5 is a schematic diagram of performing area division on prediction space.

For example, it is assumed that the T dimension indicators include visible and invisible areas (including a visible area and an invisible area) and city functional areas (including a residential area, a commercial area, and an industrial area). The prediction space is divided based on the visible area and the invisible area to obtain a first map. Area boundary lines of the first map are shown in a in FIG. 5, and the first map is divided into the visible area and the invisible area. The prediction space is divided based on the residential area, the commercial area, and the industrial area to obtain a second map, where area boundary lines of the second map are shown in b in FIG. 5, and the second map is divided into the industrial area, the residential area, and the commercial area. Area boundary lines in the first map and the second map are superimposed to obtain a third map, where area boundary lines of the third map are shown in c in FIG. 5, and the prediction space is divided into five areas based on the area boundary lines in c in FIG. 5, as shown in c in FIG. 5.

In an embodiment, in an example, the performing area division on the prediction space based on T dimension indicators includes:

Area division is first performed on the prediction space based on any dimension indicator $D_1$ in the T dimension indicators, to obtain $S_1$ areas $P_1$. Then, area division is performed on the $S_1$ areas $P_1$ based on any dimension indicator $D_2$ in T−1 dimension indicators, to obtain S2 areas $P_2$, where the T−1 dimension indicators are dimension indicators other than the dimension indicator $D_1$ in the T dimension indicators, and $S_2$ is not less than $S_1$. Subsequently, area division is performed on the $S_2$ areas $P_2$ based on any dimension indicator $D_3$ in T−2 dimension indicators, to obtain $S_3$ areas $P_3$, where the T−1 dimension indicators are dimension indicators other than the dimension indicator $D_1$ and the dimension indicator $D_2$ in the T dimension indicators, and $S_3$ is not less than $S_2$. ST areas PT are obtained after area division is performed based on the T dimension indicators in the foregoing manner. The ST areas PT are the foregoing plurality of target areas.

Figure 6:
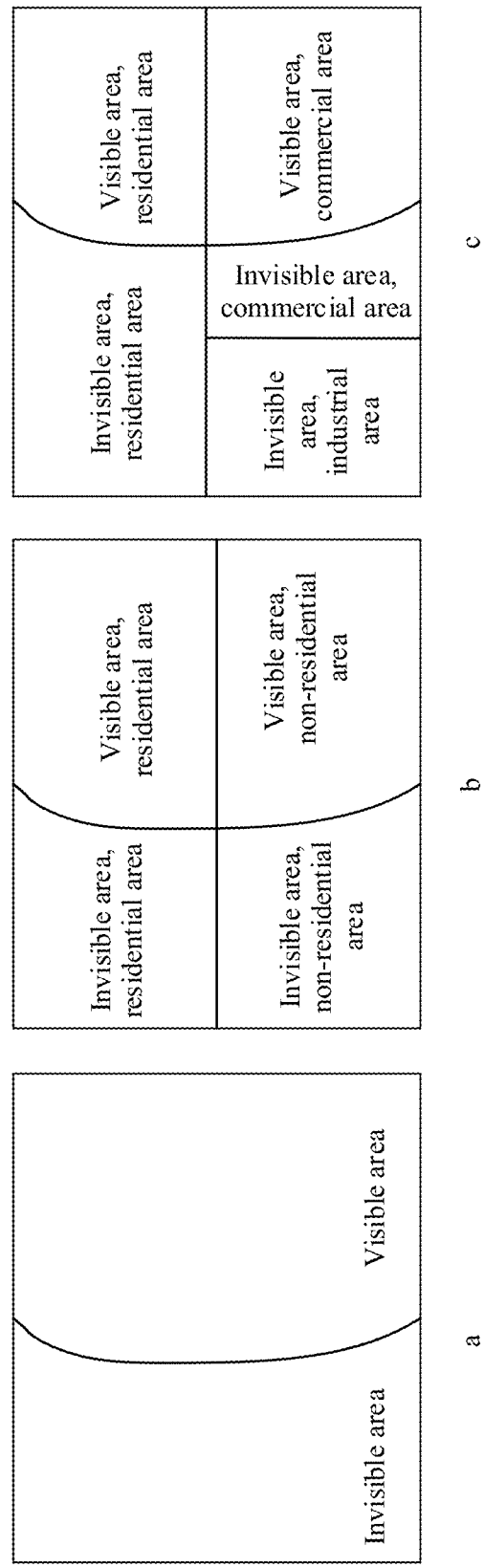
FIG. 6 is another schematic diagram of performing area division on prediction space.

For example, as shown in FIG. 6, area division is first performed on the prediction space based on a first dimension indicator (for example, a visible area and an invisible area) to obtain a visible area and an invisible area, as shown in a in FIG. 6; then area division is performed on the visible area and the invisible area based on a second dimension indicator (for example, a residential area and a non-residential area) to obtain four areas, as shown in b in FIG. 6; and finally area division is performed on the non-residential area based on a third dimension indicator (for example, a commercial area and an industrial area) to obtain three areas, as shown in c in FIG. 6.

Figure 7:
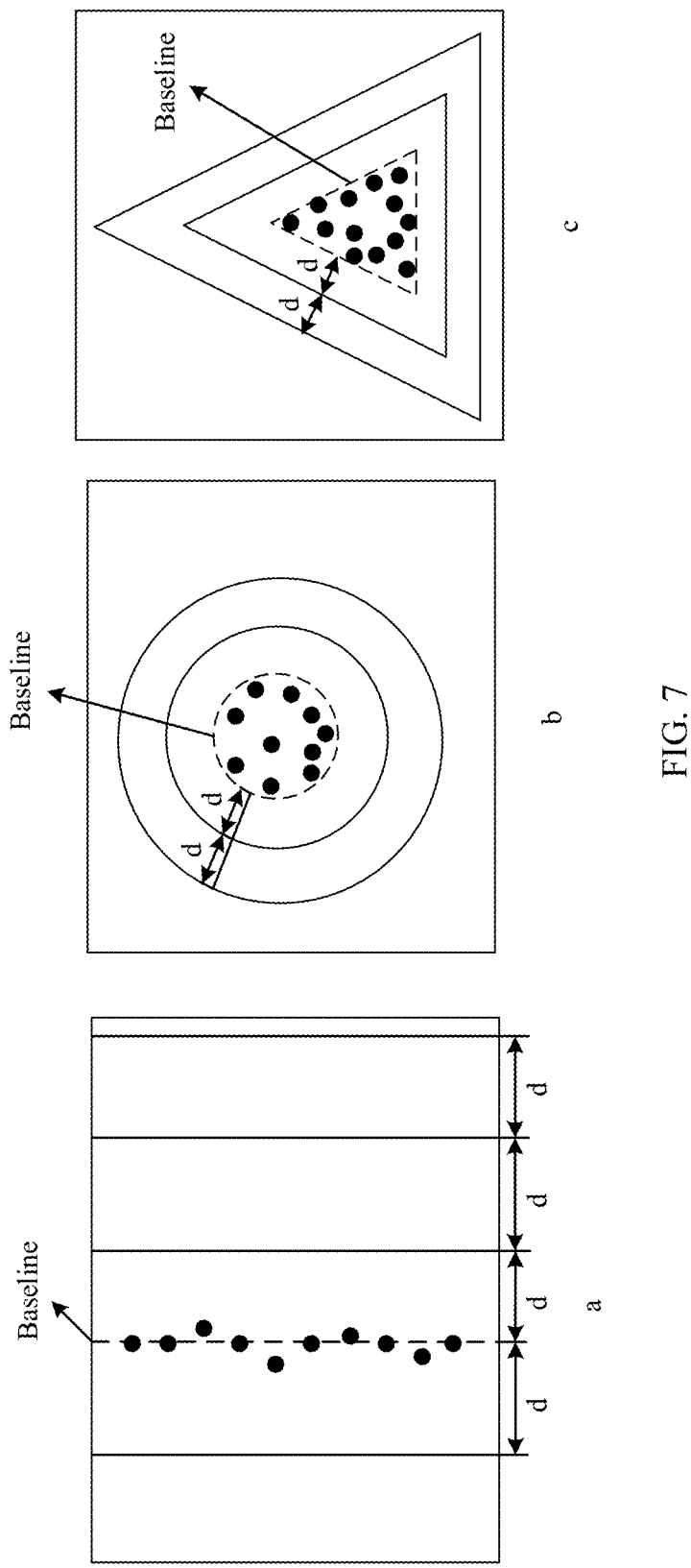
FIG. 7 is another schematic diagram of performing area division on prediction space.

In an embodiment, it is determined, based on the location information of the S first sampling points, that the S first sampling points are approximately distributed regularly. For example, the S first sampling points are approximately distributed in a straight line, as shown in a in FIG. 7. For another example, the S first sampling points are approximately distributed in a circle, as shown in b in FIG. 7. For another example, the S first sampling points are approximately distributed in a triangle, as shown in c in FIG. 7. Certainly, the S first sampling points may alternatively be distributed in another regular shape, such as a square or a rectangle. After it is determined that the S first sampling points are distributed regularly, a baseline is obtained, where the S first sampling points are located or approximately located on the baseline, or located in an area formed by the baseline. Then, area division is performed on the prediction space based on the baseline to obtain a second division map, where distances between points on each boundary line of an area in the map and corresponding points on the baseline are the same, as shown in FIG. 7. Then, boundary lines in the second division map are superimposed on the boundary lines in the T first division maps, to obtain the plurality of target areas.

In an embodiment, in an example, performing area division on the prediction space to obtain a plurality of target areas includes:

S1: performing area division on the prediction space based on T dimension indicators, to obtain a plurality of first areas, where any one of the plurality of first areas meets some or all of the T dimension indicators, and T is an integer greater than 0;

S2: obtaining a second parameter through calculation based on the plurality of first areas and a geodetector algorithm, where the second parameter indicates a significance degree of spatial stratified heterogeneity of areas obtained by performing area division on the prediction space, and a larger value of the second parameter indicates a higher significance degree of the spatial stratified heterogeneity of the areas; and S3: comparing the second parameter with a first preset threshold; and repeating S1 to S3 when the second parameter is not greater than the first preset threshold, until the second parameter is greater than the first preset threshold; or determining the plurality of first areas as the plurality of target areas when the second parameter is greater than the first preset threshold.

A plurality of dimension indicators used for any time of area division on the prediction space intersect or do not intersect with a plurality of dimension indicators used for any other time of area division on the prediction space, that is, a plurality of dimension indicators used for any time of area division on the prediction space may be partially the same as or completely different from a plurality of dimension indicators used for any other time of area division on the prediction space.

In an embodiment, a value range of the second parameter is [0, 1]. The dimension indicators may further include a land use type, a road, a water system, a point of interest, and a building type, such as a geometric form, a material, a building age, and a floor area ratio.

It should be noted herein that, for a specific implementation process of performing area division on the prediction space based on the T dimension indicators to obtain the plurality of first areas, refer to the foregoing implementation process of performing area division on the prediction space based on the T dimension indicators to obtain the plurality of target areas, and details are not described herein again.

In an example, the area division includes that the area division may be performed based on subjective experience, or may be performed based on an existing spatial computing method, for example, a k-means clustering algorithm, a density-based spatial clustering of application with noise (DBSCAN) algorithm, or a Gaussian mixed model expectation-maximization (GMM-EM) algorithm. For example, clustering may be performed based on a building type, a geometric feature, a construction age, or the like.

It should be noted herein that, a higher significance degree of the spatial stratified heterogeneity of the areas obtained by performing area division on the prediction space indicates a smaller variance of wireless signal received strength of first sampling points located in a same area, and a larger variance of wireless signal received strength of first sampling points located in adjacent areas.

Further, as shown in FIG. 4, after area division is performed on the prediction space to obtain the plurality of target areas, whether each of the plurality of target areas meets the first preset condition is determined. In an embodiment, the first preset condition includes that the target area has a global spatial autocorrelation characteristic. Specifically, for any one of the plurality of target areas, a third parameter of the target area is obtained through calculation based on location information of a first sampling point in the target area and corresponding wireless signal received strength, where the third parameter of the target area indicates a degree of a global spatial autocorrelation characteristic of the target area. When it is determined, based on the third parameter of the target area, that the target area does not have the global spatial autocorrelation characteristic, a machine learning algorithm is determined as the target algorithm. When it is determined, based on a third parameter of each of the plurality of target areas, that each target area has a global spatial autocorrelation characteristic, whether each of the plurality of target areas meets the second preset condition is determined.

It should be noted herein that, when the third parameter of the target area is calculated, if the target area does not include a first sampling point, it is considered by default that the area has the global spatial autocorrelation characteristic.

In an embodiment, the second preset condition includes that the target area includes a first sampling point. Specifically, whether each of the plurality of target areas includes a first sampling point is determined. If any one of the plurality of target areas does not include a first sampling point, any method in the B-shade method cluster is determined as the target algorithm; or if all of the plurality of target areas include a first sampling point, whether each of the plurality of target areas meets the third preset condition is determined. In an embodiment, the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

Specifically, whether a quantity of first sampling points included in each of the plurality of target areas is greater than the preset quantity is determined; and if a quantity of first sampling points included in any one of the plurality of target areas is not greater than the preset quantity, any method in the MSN method cluster is determined as the target algorithm; or if the quantity of first sampling points included in each of the plurality of target areas is greater than the preset quantity, the stratified Kriging algorithm is determined as the target algorithm.

Alternatively, whether a quantity of first sampling points in each of the plurality of target areas is greater than the preset quantity and whether wireless signal received strength of the first sampling point in the target area meets spatial second-order stationarity are determined; and if a quantity of first sampling points included in any one of the plurality of target areas is not greater than the preset quantity, or wireless signal received strength of a first sampling point in any one of the plurality of target areas does not meet spatial second-order stationarity, any method in the MSN method cluster is determined as the target algorithm; or if the quantity of first sampling points included in each of the plurality of target areas is greater than the preset quantity, and the wireless signal received strength of the first sampling point in the target area does not meet spatial second-order stationarity, the stratified Kriging algorithm is determined as the target algorithm.

It should be noted herein that generating a wireless signal propagation model of the prediction space based on the stratified Kriging algorithm, the location information of the S first sampling points, and the corresponding wireless signal received strength includes: performing, for each of the plurality of target areas, interpolation calculation for location information of a first sampling point in the target area and corresponding wireless signal received strength by using any method in the Kriging method cluster, to obtain a wireless signal propagation model in each target area; or selecting, for each of the plurality of target areas, a same Kriging algorithm from the Kriging method cluster to perform interpolation calculation for location information of a first sampling point in the target area and corresponding wireless signal received strength, to obtain a wireless signal propagation model in each target area; and then obtaining the wireless signal propagation model of the prediction space based on the wireless signal propagation model in each of the plurality of target areas.

In an example, the obtaining the wireless signal propagation model of the prediction space based on the wireless signal propagation model in each of the plurality of target areas includes: obtaining a wireless signal coverage electromagnetic map of each target area based on the wireless signal propagation model in each of the plurality of target areas, then splicing wireless signal coverage electromagnetic maps of the plurality of target areas to obtain a wireless signal coverage electromagnetic map of the prediction space, and finally obtaining the wireless signal propagation model of the prediction space based on the wireless signal coverage electromagnetic map of the prediction space.

It should be noted herein that, when the target algorithm is any method in the Kriging method cluster, the BHM algorithm, any method in the B-shade method cluster, any method in the MSN method cluster, or the stratified Kriging algorithm, generating the wireless signal propagation model based on the target algorithm, the location information of the sampling points, and the corresponding wireless signal received strength refers to performing interpolation calculation on the location information of the sampling points and the corresponding wireless signal received strength based on the target algorithm, to obtain the wireless signal propagation model.

S304: Obtain wireless signal received strength of the terminal at any location in the prediction space based on the wireless signal propagation model of the prediction space.

Specifically, the wireless signal propagation model of the prediction space may be considered as a function in which wireless signal received strength varies with location information. If a piece of location information in the prediction space is given, wireless signal received strength of the terminal at a location indicated by the location information may be predicted based on the wireless signal propagation model.

It can be learned that, in the solution of this application, whether the prediction space meets a preset condition is determined based on sampling points in the prediction space, a suitable algorithm is selected based on whether the prediction space meets the preset condition, the wireless signal propagation model of the prediction space is generated based on the suitable algorithm, location information of the sampling points, and corresponding wireless signal received strength, and then the wireless signal received strength of the terminal at any location in the prediction space is obtained based on the wireless signal propagation model, so that precision of the wireless signal propagation model of the prediction space is improved, and precision of a wireless signal propagation prediction result is further improved.

The following describes another specific implementation process of predicting wireless signal propagation by the prediction apparatus, the operation platform, or the cloud server.

Figure 8:
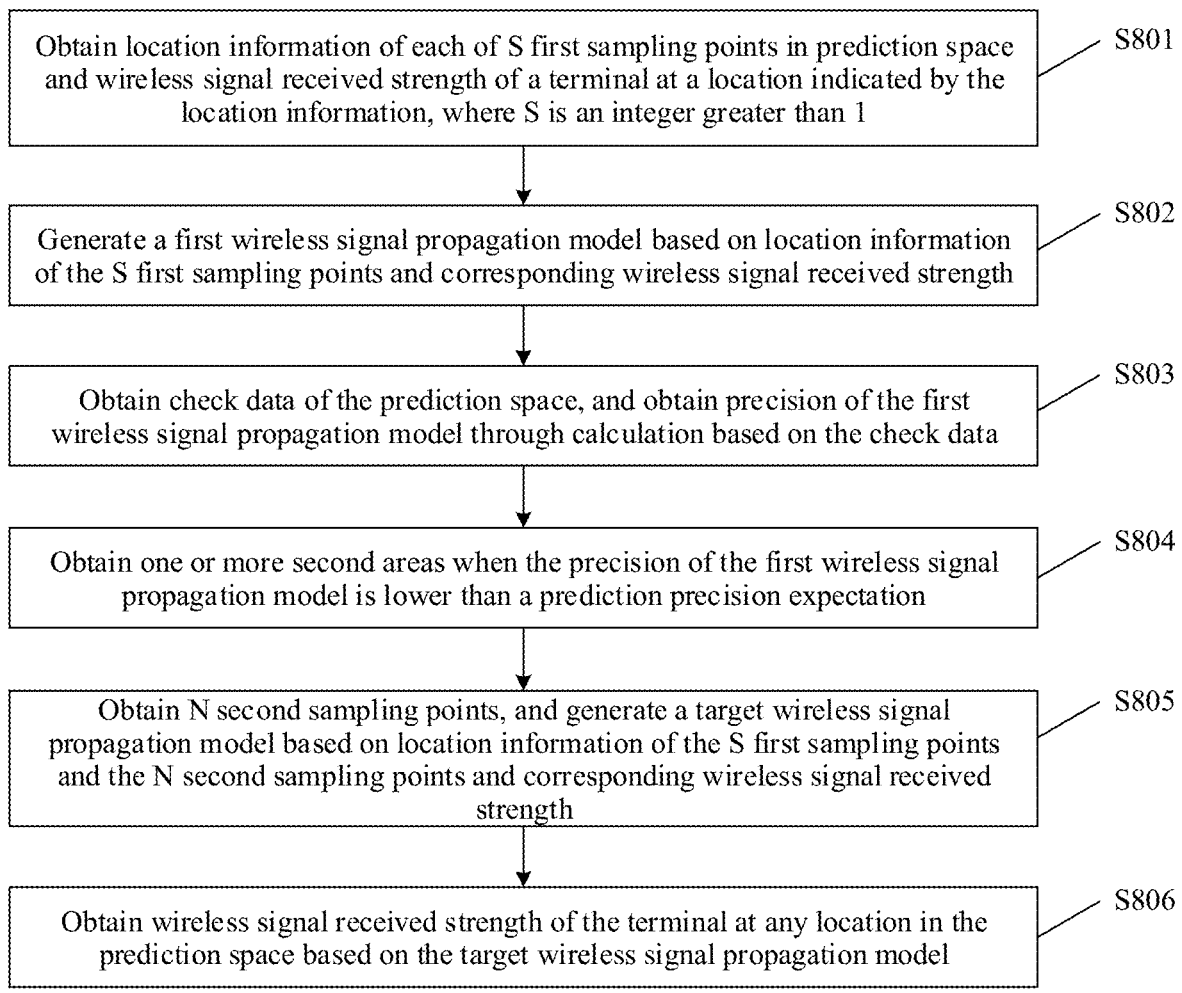
FIG. 8 is a schematic flowchart of another wireless signal propagation prediction method according to an embodiment of this application.

FIG. 8 is a schematic flowchart of a wireless signal propagation model prediction method according to an embodiment of this application. As shown in FIG. 8, the method includes the following operations.

S801: Obtain location information of each of S first sampling points in prediction space and wireless signal received strength of a terminal at a location indicated by the location information, where S is an integer greater than 1.

The wireless signal received strength and location information may be obtained from data that is reported by the terminal 102 and that carries location information of the terminal and wireless signal received strength of the terminal 102 at a location indicated by the location information, such as an MDT result, an MR, IoT data, or data obtained by a drive test device through random sampling.

In an embodiment, the location information may be coordinates, or may be grid information indicating a location.

S802: Generate a first wireless signal propagation model based on location information of the S first sampling points and corresponding wireless signal received strength.

It should be noted herein that, for a specific process of generating the first wireless signal propagation model based on the location information of the S first sampling points and the corresponding wireless signal received strength, refer to related descriptions of operations S302 and S303, and details are not described herein again.

S803: Obtain check data of the prediction space, and obtain precision of the first wireless signal propagation model through calculation based on the check data.

In an embodiment, the check data may be drive test data, data reported by the terminal, or real data in another form.

Specifically, the drive test data includes a plurality of pieces of location information and first wireless signal received strength of the terminal at locations indicated by the plurality of pieces of location information. The plurality of pieces of location information are input into the first wireless signal propagation model for calculation, to obtain second wireless signal received strength corresponding to the plurality of pieces of location information. An error value is calculated based on the first wireless signal received strength and the second wireless signal received strength corresponding to the plurality of pieces of location information, where the error value indicates the precision of the first wireless signal propagation model, and a smaller error value indicates higher precision of the first wireless signal propagation model.

In an embodiment, the error value includes but is not limited to a mean squared error, a root mean squared error, a mean absolute error, or a standard deviation.

S804: Obtain one or more second areas when the precision of the first wireless signal propagation model is lower than a prediction precision expectation.

Specifically, when the precision of the first wireless signal propagation model is lower than the prediction precision expectation, a real wireless signal electromagnetic coverage map of the prediction space is obtained based on the check data of the prediction space, and then a predicted wireless signal electromagnetic coverage map is obtained based on the first wireless signal propagation model. Finally, the one or more second areas are obtained based on the predicted wireless signal electromagnetic coverage map and the real wireless signal electromagnetic coverage map. In the one or more second areas, an absolute value of a difference between first wireless signal received strength and second wireless signal received strength corresponding to same location information is greater than a second preset threshold.

S805: Obtain N second sampling points, and generate a target wireless signal propagation model based on location information of the S first sampling points and the N second sampling points and corresponding wireless signal received strength.

Location information of any one of the N second sampling points is different from location information of each of the S first sampling points, each of the N second sampling points is located in the second area, and N is an integer greater than 0.

In a specific embodiment, the obtaining N second sampling points, and generating a target wireless signal propagation model based on location information of the S first sampling points and the N second sampling points and corresponding wireless signal received strength includes:

S10: obtaining $N_i$ initial sampling points, where location information of each of the $N_i$ initial sampling points is different from that of the S first sampling points, each of the N initial sampling points is located in the second area, and $N_i$ is an integer greater than 1;

S20: performing random disturbance processing on the $N_i$ initial sampling points to obtain $N_i$ reference sampling points;

S30: generating a wireless signal propagation model $M_i$ based on a preset algorithm, the location information of the S first sampling points and the N second sampling points, and the corresponding wireless signal received strength, where the N second sampling points include a target sampling point set and the $N_i$ reference sampling points, and i is an integer greater than 0; and S40: determining whether the wireless signal propagation model $M_i$ meets a first convergence condition and a second convergence condition; and repeating S20 to S40 when the wireless signal propagation model does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model meets the second convergence condition.

The second convergence condition is different from the first convergence condition, and when i=1, the target sampling point set is an empty set.

Figure 9:
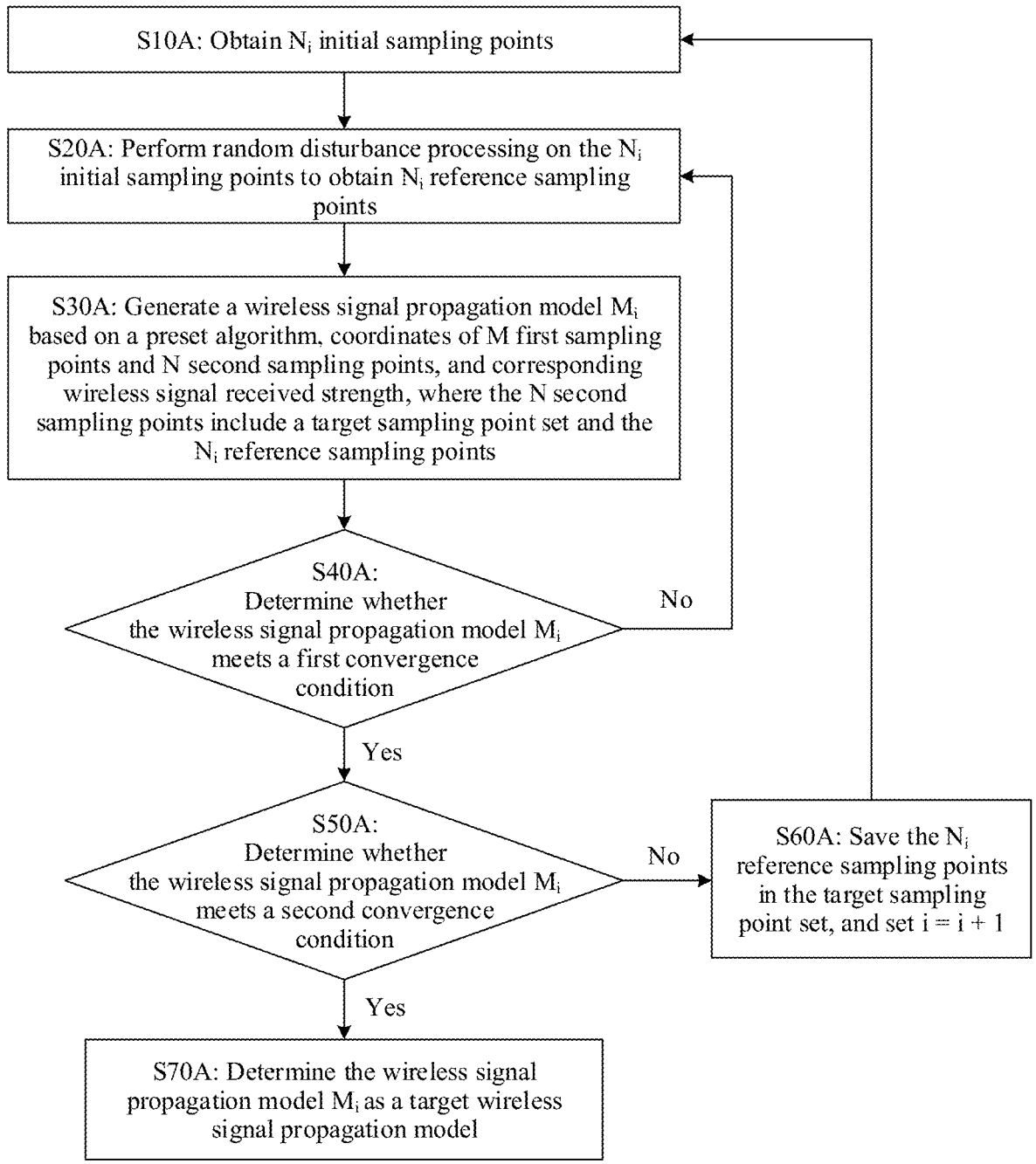
FIG. 9 is a schematic flowchart of another wireless signal propagation prediction method according to an embodiment of this application.

Specifically, FIG. 9 includes the following operations.

S10A: Obtain $N_i$ initial sampling points.

Location information of each of the $N_i$ initial sampling points is different from that of the S first sampling points, each of the N initial sampling points is located in the second area, and $N_i$ is an integer greater than 1.

In an embodiment, the obtaining $N_i$ initial sampling points includes:

obtaining a plurality of first reference sampling point sets, where sampling points in the plurality of first reference sampling point sets are all located in the second area; obtaining a plurality of second reference sampling point sets based on the plurality of first reference sampling point sets and the S first sampling points, where sampling points in a $j^{th}$ second reference sampling point set in the plurality of second reference sampling point sets include the S first sampling points and a sampling point in a $j^{th}$ first reference sampling point set in the plurality of first reference sampling point sets; performing a first operation based on location information of a sampling point in each of the plurality of second reference sampling point sets and corresponding wireless signal received strength to obtain a plurality of reference wireless signal propagation models, where the plurality of reference wireless signal propagation models are in a one-to-one correspondence with the plurality of second reference sampling point sets; obtaining an error value of each of the plurality of reference wireless signal propagation models based on drive test data; and obtaining the $N_i$ initial sampling points based on the error value, where the $N_i$ initial sampling points are sampling points other than the S first sampling points in a second reference sampling point set corresponding to a smallest error value.

Specifically, a plurality of first reference sampling point sets may be obtained from a plurality of second areas in a plurality of sampling manners (for example, systematic sampling, random sampling, stratified sampling, and overall sampling). The plurality of first reference sampling point sets are in a one-to-one correspondence with the plurality of sampling manners.

Any set of sampling points in the plurality of first reference sampling point sets may be evenly obtained from the plurality of second areas. For example, if there are three second areas, six sampling points need to be obtained, and two sampling points are obtained from each of the three second areas. Alternatively, the sampling points may be obtained from the plurality of second areas according to a specific rule. For example, the sampling points may be obtained based on sizes of the plurality of second areas, and a larger quantity of sampling points are obtained from a larger second area. For another example, the sampling points may be obtained based on errors of the plurality of second areas, and a larger quantity of sampling points are obtained from a second area with a larger error compared with the check data.

It should be noted herein that, when a sampling point is obtained from the second area, location information of the sampling point is first determined, and then wireless signal received strength of the terminal at a location indicated by the location information is obtained based on the check data, or wireless signal received strength corresponding to the location information is obtained from data reported by the terminal located at a location indicated by the location information.

After the plurality of first reference sampling point sets are obtained, the S first sampling points are saved in the plurality of first reference sampling point sets to obtain the plurality of second reference sampling point sets. Then, for each of the plurality of second reference sampling point sets, an algorithm for the second reference sampling point set is obtained based on related descriptions in S302 and S303, and a wireless signal propagation model corresponding to the second reference sampling point set is generated based on the algorithm for the second reference sampling point set, location information in the second reference sampling point set, and corresponding wireless signal received strength.

After a wireless signal propagation model of each of the plurality of second reference sampling point sets is obtained, an error value of the wireless signal propagation model of each second reference sampling point set is calculated based on the check data. For a process of calculating the error value, refer to related descriptions of operation S50A, and details are not described herein again. The $N_i$ initial sampling points are obtained from the plurality of second reference sampling point sets based on error values of wireless signal propagation models of the plurality of second reference sampling point sets, where the $N_i$ initial sampling points are sampling points other than the S first sampling points in the second reference sampling point set corresponding to the smallest error value.

In an embodiment, a difference between $N_i$ and $N_{i-1}$ may be the same as or different from a difference between $N_{i-1}$ and $N_{i-2}$.

S20A: Perform random disturbance processing on the $N_i$ initial sampling points to obtain $N_i$ reference sampling points.

Random disturbance is performed on location information and/or corresponding wireless signal received strength of each of the $N_i$ initial sampling points, to obtain the $N_i$ reference sampling points.

S30A: Generate a wireless signal propagation model $M_i$ based on a preset algorithm, the location information of the S first sampling points and the N second sampling points, and the corresponding wireless signal received strength.

The preset algorithm is an algorithm used when a wireless signal propagation model corresponding to the smallest error value is generated. The N second sampling points include the target sampling point set and the $N_i$ reference sampling points.

S40A: Determine whether the wireless signal propagation model $M_i$ meets a first convergence condition.

In an embodiment, the determining whether the wireless signal propagation model $M_i$ meets a first convergence condition includes:

inputting the plurality of pieces of location information in the check data into the first wireless signal propagation model for calculation, to obtain the second wireless signal received strength corresponding to the plurality of pieces of location information; calculating an error value based on the first wireless signal received strength and the second wireless signal received strength corresponding to the plurality of pieces of location information in the check data; and when the error value approaches a first value, determining that the wireless signal propagation model $M_i$ meets the first convergence condition; or when the error value does not approach the first value, determining that the wireless signal propagation model $M_i$ does not meet the first convergence condition.

When the wireless signal propagation model $M_i$ meets the first convergence condition, S50A is performed; or when the signal propagation model $M_i$ does not meet the first convergence condition, S20A to S40A are performed.

S50A: Determine whether the wireless signal propagation model $M_i$ meets a second convergence condition.

In an embodiment, the determining whether the wireless signal propagation model $M_i$ meets a first convergence condition includes:

inputting the plurality of pieces of location information in the check data into the first wireless signal propagation model for calculation, to obtain the second wireless signal received strength corresponding to the plurality of pieces of location information; calculating an error value based on the first wireless signal received strength and the second wireless signal received strength corresponding to the plurality of pieces of location information in the check data; and when the error value approaches a second value, determining that the wireless signal propagation model $M_i$ meets the second convergence condition; or when the error value does not approach the second value, determining that the wireless signal propagation model $M_i$ does not meet the second convergence condition.

That the second convergence condition is different from the first convergence condition means that the second value is less than the first value.

When the wireless signal propagation model $M_i$ meets the second convergence condition, S70A is performed; or when the signal propagation model $M_i$ does not meet the second convergence condition, S60A is performed.

S60A: Save the $N_i$ reference sampling points in the target sampling point set, and set i=i+1.

After setting i=i+1, operations S10A to S50A are performed.

S70A: Determine the wireless signal propagation model $M_i$ as the target wireless signal propagation model.

In a specific embodiment, the obtaining N second sampling points, and generating a target wireless signal propagation model based on location information of the S first sampling points and the N second sampling points and corresponding wireless signal received strength includes:

S10': obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength, where the N second sampling points include a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition.

The second convergence condition is different from the first convergence condition, and when i=1, the sampling point set $A_{i-1}$ is an empty set.

Figure 10:
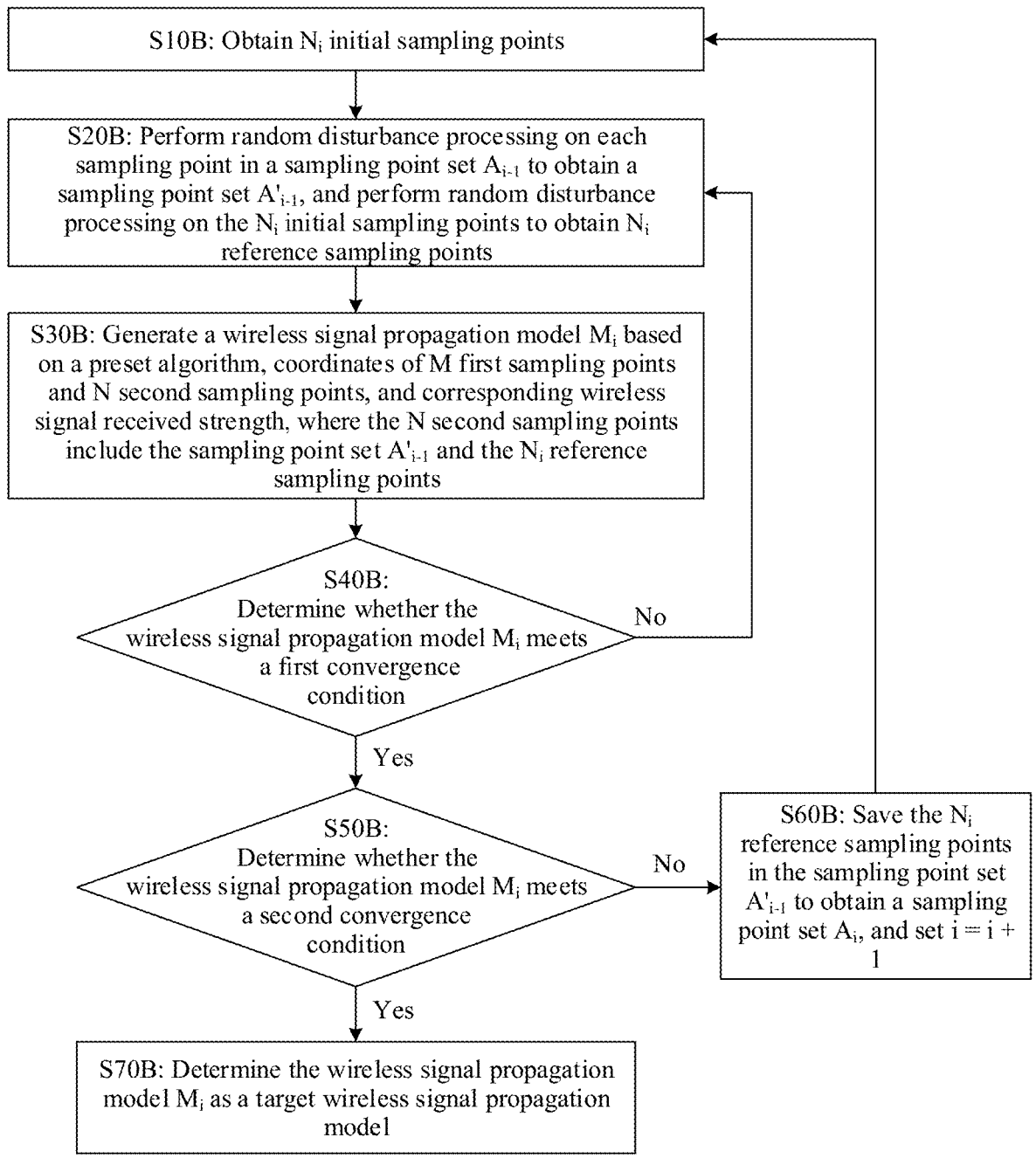
FIG. 10 is a schematic flowchart of another wireless signal propagation prediction method according to an embodiment of this application.

Specifically, FIG. 10 includes the following operations.

S10B: Obtain $N_i$ initial sampling points.

Location information of each of the $N_i$ initial sampling points is different from that of the S first sampling points, each of the N initial sampling points is located in the second area, and $N_i$ is an integer greater than 1.

It should be noted herein that, for a specific process of obtaining the $N_i$ initial sampling points, refer to related descriptions of the foregoing operation S10A, and details are not described herein again.

S20B: Perform random disturbance processing on each sampling point in a sampling point set $A_{i-1}$ to obtain a sampling point set $A'_{i-1}$, and performing random disturbance processing on the $N_i$ initial sampling points to obtain $N_i$ reference sampling points.

Specifically, the performing random disturbance processing on each sampling point in a sampling point set $A_{i-1}$ to obtain a sampling point set $A'_{i-1}$ includes: performing random disturbance on location information and/or corresponding wireless signal received strength of each sampling point in the sampling point set $A_{i-1}$ to obtain the sampling point set $A'_{i-1}$.

The performing random disturbance processing on the $N_i$ initial sampling points to obtain $N_i$ reference sampling points includes: performing random disturbance processing on location information and/or corresponding wireless signal received strength of each of the $N_i$ initial sampling points to obtain the $N_i$ reference sampling points.

S30B: Generate a wireless signal propagation model $M_i$ based on a preset algorithm, the location information of the S first sampling points and the N second sampling points, and the corresponding wireless signal received strength.

S40B: Determine whether the wireless signal propagation model $M_i$ meets a first convergence condition.

When the wireless signal propagation model $M_i$ meets the first convergence condition, S50B is performed; or when the signal propagation model $M_i$ does not meet the first convergence condition, S20B to S40B are performed.

S50B: Determine whether the wireless signal propagation model $M_i$ meets a second convergence condition.

The second convergence condition is stricter than the first convergence condition, and when i=1, the sampling point set $A_{i-1}$ is an empty set.

When the wireless signal propagation model $M_i$ meets the second convergence condition, S70B is performed; or when the signal propagation model $M_i$ does not meet the second convergence condition, S60B is performed.

S60B: Save the $N_i$ reference sampling points in the sampling point set $A'_{i-1}$ to obtain a sampling point set $A_i$, and set i=i+1.

After setting i=i+1, operations S10B to S50B are performed.

S70B: Determine the wireless signal propagation model $M_i$ as the target wireless signal propagation model.

It should be noted that, for a specific implementation process of S10B to S70B, refer to related descriptions of S10A to S70A, and details are not described herein again.

In an embodiment, that the first wireless signal propagation model is generated based on the location information of the S first sampling points and the corresponding wireless signal received strength includes:

calculating a first parameter of the prediction space based on the location information of the S first sampling points and the corresponding wireless signal received strength; obtaining an interpolation algorithm C based on the first parameter of the prediction space, where the first parameter indicates a degree of a global spatial autocorrelation characteristic of the prediction space, and a larger value of the first parameter indicates a higher degree of the global spatial autocorrelation characteristic of the prediction space; and obtaining the first wireless signal receiving model through calculation based on the interpolation algorithm C, the location information of the S first sampling points, and the corresponding wireless signal received strength.

In an embodiment, the obtaining an algorithm C based on the first parameter of the prediction space includes:

obtaining a first algorithm and determining the first algorithm as the algorithm C when determining, based on the first parameter, that the prediction space has the global spatial autocorrelation characteristic; or obtaining a second algorithm and determining the second algorithm as the algorithm C when determining, based on the first parameter, that the prediction space does not have the global spatial autocorrelation characteristic.

In an embodiment, the first algorithm includes a Bayesian hierarchical model BHM algorithm or any method in a Kriging method cluster, and the obtaining a first algorithm includes: determining the BHM algorithm as the first algorithm when the wireless signal received strength of the S first sampling points meets preset probability distribution; or determining any method in the Kriging method cluster as the first algorithm when the wireless signal received strength of the S first sampling points does not meet the preset probability distribution.

In an embodiment, the preset probability distribution may be normal distribution, Poisson distribution, binomial distribution, Gaussian distribution, or other probability distribution.

In an embodiment, the second algorithm includes a machine learning algorithm, any method in a B-shade method cluster, any method in an MSN method cluster, or a stratified Kriging algorithm, and the obtaining a second algorithm includes:

performing area division on the prediction space to obtain a plurality of target areas; determining whether each of the plurality of target areas meets a preset condition; and determining the stratified Kriging algorithm as the second algorithm when each of the plurality of target areas meets the preset condition; or obtaining a third algorithm and determining the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and the determining the stratified Kriging algorithm as the second algorithm when each of the plurality of target areas meets the preset condition includes:

determining the stratified Kriging algorithm as the second algorithm when each of the plurality of target areas simultaneously meets the first preset condition, the second preset condition, and the third preset condition; and the obtaining a third algorithm when any one of the plurality of target areas does not meet the preset condition includes:

determining the machine learning algorithm as the third algorithm when any one of the plurality of target areas does not meet the first preset condition; or determining any method in the B-shade method cluster as the third algorithm when any one of the plurality of target areas meets the first preset condition but does not meet the second preset condition; or determining any method in the MSN method cluster as the third algorithm when any one of the plurality of target areas meets the first preset condition and the second preset condition but does not meet the third preset condition.

In an embodiment, the first preset condition includes that the target area has a global spatial autocorrelation characteristic; and the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, the performing area division on the prediction space to obtain a plurality of target areas includes:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter indicates a significance degree of spatial stratified heterogeneity of areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold.

T dimension indicators used for any time of area division on the prediction space partially intersect or do not intersect with T dimension indicators used for any other time of area division on the prediction space.

It should be noted herein that, for a specific implementation process of obtaining the algorithm C based on the first parameter of the prediction space, refer to related descriptions of obtaining the target algorithm based on the first parameter in S302 and S303, and details are not described herein again.

S806: Obtain wireless signal received strength of the terminal at any location in the prediction space based on the target wireless signal propagation model.

Specifically, the target wireless signal propagation model may be considered as a function in which wireless signal received strength varies with location information. If a piece of location information in the prediction space is given, wireless signal received strength of the terminal at a location indicated by the location information may be predicted based on the wireless signal propagation model.

It can be learned that, in the solution of this embodiment, after the wireless signal propagation model of the prediction space is obtained through calculation based on the location information of the S first sampling points and the corresponding wireless signal received strength, when the precision of the wireless signal propagation model is lower than the prediction precision expectation, a plurality of second sampling points are obtained in an area with a large error in the prediction space, and then interpolation calculation is performed on location information of the S first sampling points and the plurality of sampling points and corresponding wireless signal received strength, to obtain a wireless signal propagation model with higher precision, so that a wireless signal propagation prediction result with higher accuracy can be obtained.

It should be noted herein that the method in this application may be applied to a scenario in which plane-shaped coverage information needs to be predicted based on spatial discrete points. For example, a sales status of retail stores in an entire area is predicted based on a sales status of a discrete retail store, and a traffic requirement of each base station in an area is predicted based on a traffic requirement of a discrete base station.

Figure 11:
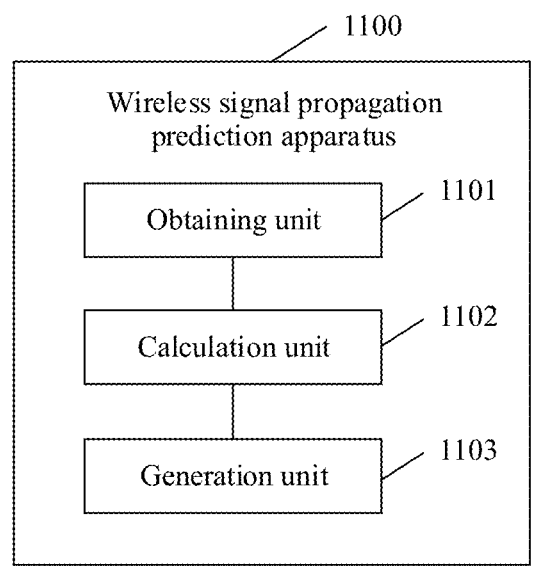
FIG. 11 is a schematic diagram of a structure of a wireless signal propagation prediction apparatus according to an embodiment of this application.

FIG. 11 is a schematic diagram of a structure of a wireless signal propagation prediction apparatus according to an embodiment of this application. As shown in FIG. 11, the apparatus 1100 includes:

an obtaining unit 1101, configured to obtain location information of each of S first sampling points in prediction space and wireless signal received strength of a terminal at a location indicated by the location information, where S is an integer greater than 1;

a calculation unit 1102, configured to obtain a first parameter of the prediction space through calculation based on location information of the S first sampling points and corresponding wireless signal received strength, where the first parameter is used to indicate a degree of a global spatial autocorrelation characteristic of the prediction space, where the obtaining unit 1101 is further configured to obtain a target algorithm based on the first parameter; and a generation unit 1103, configured to generate a wireless signal propagation model of the prediction space based on the target algorithm, the location information of the S first sampling points, and the corresponding wireless signal received strength.

The obtaining unit 1101 is further configured to obtain wireless signal received strength of the terminal at any location in the prediction space based on the wireless signal propagation model of the prediction space.

In an embodiment, in an aspect of obtaining a target algorithm based on the first parameter of the prediction space, the obtaining unit 1101 is configured to:

obtain a first algorithm and determine the first algorithm as the target algorithm when determining, based on the first parameter, that the prediction space has the global spatial autocorrelation characteristic; or obtain a second algorithm and determine the second algorithm as the target algorithm when determining, based on the first parameter, that the prediction space has the global spatial autocorrelation characteristic.

In an embodiment, the first algorithm includes any method in a Kriging method cluster or a BHM algorithm, and in an aspect of obtaining a first algorithm, the obtaining unit 1101 is configured to:

determine whether the wireless signal received strength of the S first sampling points meets preset probability distribution; and determine the BHM algorithm as the first algorithm if the wireless signal received strength of the S first sampling points meets the preset probability distribution; or determine any method in the Kriging method cluster as the first algorithm if the wireless signal received strength of the S first sampling points does not meet the preset probability distribution.

In an embodiment, the second algorithm includes a machine learning algorithm, any method in a B-shade method cluster, any method in an MSN method cluster, or a stratified Kriging algorithm, and in an aspect of obtaining a second algorithm, the obtaining unit 1101 is configured to:

perform area division on the prediction space to obtain a plurality of target areas; and determine the stratified Kriging algorithm as the second algorithm when each of the plurality of target areas meets a preset condition; or obtain a third algorithm and determine the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and in an aspect of determining the stratified Kriging algorithm as the second algorithm when each of the plurality of target areas meets a preset condition, the obtaining unit 1101 is configured to:

determine the stratified Kriging algorithm as the second algorithm when each of the plurality of target areas simultaneously meets the first preset condition, the second preset condition, and the third preset condition; and in an aspect of obtaining a third algorithm when any one of the plurality of target areas does not meet the preset condition, the obtaining unit 1101 is configured to:

determine the machine learning algorithm as the third algorithm when any one of the plurality of target areas does not meet the first preset condition; or determine any method in the B-shade method cluster as the third algorithm when any one of the plurality of target areas meets the first preset condition but does not meet the second preset condition; or determine any method in the MSN method cluster as the third algorithm when any one of the plurality of target areas meets the first preset condition and the second preset condition but does not meet the third preset condition.

In an embodiment, the first preset condition includes that the target area has a global spatial autocorrelation characteristic; the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, in an aspect of performing area division on the prediction space to obtain a plurality of target areas, the obtaining unit 1101 is configured to perform the following operations:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter is used to indicate a significance degree of spatial stratified heterogeneity of areas obtained by performing area division on the prediction space, and a larger value of the second parameter indicates a higher significance degree of the spatial stratified heterogeneity of the areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold.

T dimension indicators used for any time of area division on the prediction space partially intersect or do not intersect with T dimension indicators used for any other time of area division on the prediction space.

It should be noted that the foregoing units (the obtaining unit 1101, the calculation unit 1102, and the generation unit 1103) are configured to perform related content of the foregoing operations S301 to S304, and details are not described herein again.

In this embodiment, the wireless signal propagation prediction apparatus 1100 is presented in a form of units. The "unit" herein may be an application-specific integrated circuit (ASIC), a processor and a memory that execute one or more software or firmware programs, an integrated logic circuit, and/or another device that can provide the foregoing functions. In addition, the obtaining unit 1101, the calculation unit 1102, and the generation unit 1103 may be implemented by using a processor 1301 of a wireless signal propagation prediction apparatus shown in FIG. 13.

Figure 12:
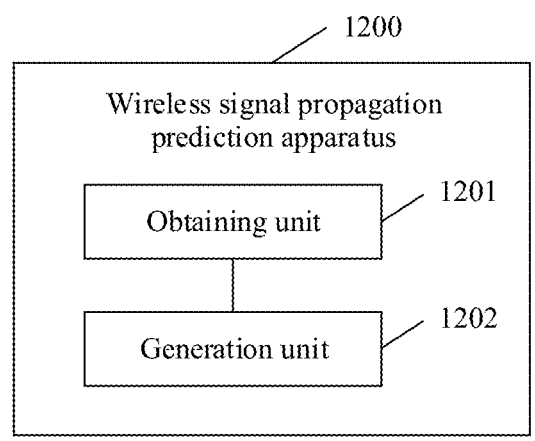
FIG. 12 is a schematic diagram of a structure of another wireless signal propagation prediction apparatus according to an embodiment of this application.

FIG. 12 is a schematic diagram of a structure of another wireless signal propagation prediction apparatus according to an embodiment of this application. As shown in FIG. 12, the apparatus 1200 includes:

an obtaining unit 1201, configured to obtain one or more second areas when precision of a first wireless signal propagation model is lower than a prediction precision expectation, where an absolute value of a difference between a predicted value of wireless signal received strength of a terminal in the second area and a check value is greater than a second preset threshold, the predicted value of the wireless signal received strength is obtained through prediction by using the first wireless signal propagation model, and the first wireless signal propagation model is generated based on location information of S first sampling points and corresponding wireless signal received strength, where the obtaining unit 1201 is further configured to obtain N second sampling points; and a generation unit 1202, configured to generate a target wireless signal propagation model based on location information of the S first sampling points and the N second sampling points and corresponding wireless signal received strength, where location information of any one of the N second sampling points is different from location information of each of the S first sampling points, each of the N second sampling points is located in the second area, and N is an integer greater than 0.

The obtaining unit 1201 is further configured to obtain wireless signal received strength of the terminal at any location in the prediction space based on the target wireless signal propagation model.

In an embodiment, in an aspect of obtaining N second sampling points, and generating a target wireless signal propagation model based on location information of the S first sampling points and the N second sampling points and corresponding wireless signal received strength, the obtaining unit 1201 and generation unit 1202 are configured to perform the following operations:

S10: obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20: performing random disturbance processing on the $N_i$ initial sampling points to obtain $N_i$ reference sampling points;

S30: generating a wireless signal propagation model $M_i$ based on a preset algorithm, the location information of the S first sampling points and the N second sampling points, and the corresponding wireless signal received strength, where the N second sampling points include a target sampling point set and the $N_i$ reference sampling points, and i is an integer greater than 0; and S40: determining whether the wireless signal propagation model $M_i$ meets a first convergence condition and a second convergence condition; and repeating operations S20 to S40 when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model $M_i$ meets the second convergence condition, where the second convergence condition is different from the first convergence condition, and when i=1, the target sampling point set is an empty set.

In an embodiment, in an aspect of obtaining N second sampling points, and generating a target wireless signal propagation model based on location information of the S first sampling points and the N second sampling points and corresponding wireless signal received strength, the obtaining unit 1201 and generation unit 1202 are configured to perform the following operations:

S10': obtaining $N_i$ initial sampling points, where location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength, where the N second sampling points include a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition.

The second convergence condition is different from the first convergence condition, and when i=1, the sampling point set $A_{i-1}$ is an empty set.

In an embodiment, in an aspect of obtaining $N_i$ initial sampling points, the obtaining unit 1201 is configured to:
obtain a plurality of first reference sampling point sets, where sampling points in the plurality of first reference sampling point sets are all located in the second area; and
obtain a plurality of second reference sampling point sets based on the plurality of first reference sampling point sets and the S first sampling points, where sampling points in a $j^{th}$ second reference sampling point set in the plurality of second reference sampling point sets include the S first sampling points and a sampling point in a $j^{th}$ first reference sampling point set in the plurality of first reference sampling point sets; generate a plurality of reference wireless signal propagation models based on location information of a sampling point in each of the plurality of second reference sampling point sets and corresponding wireless signal received strength, where the plurality of reference wireless signal propagation models are in a one-to-one correspondence with the plurality of second reference sampling point sets; obtain an error value of each of the plurality of reference wireless signal propagation models through calculation based on the check data; and obtain the $N_i$ initial sampling points based on the error value, where the $N_i$ initial sampling points are sampling points other than the S first sampling points in a second reference sampling point set corresponding to a smallest error value.

In an embodiment, the preset algorithm is an algorithm used when a reference wireless signal propagation model corresponding to the smallest error value is generated.

In an embodiment, when the first wireless signal propagation model is generated based on the location information of the S first sampling points and the corresponding wireless signal received strength, the generation unit 1202 is configured to:
calculate a first parameter of the prediction space based on the location information of the S first sampling points and the corresponding wireless signal received strength; obtain an algorithm C based on the first parameter of the prediction space, where the first parameter indicates a degree of a global spatial autocorrelation characteristic of the prediction space; and generate the first wireless signal receiving model based on the algorithm C, the location information of the S first sampling points, and the corresponding wireless signal received strength.

In an embodiment, in an aspect of obtaining an algorithm C based on the first parameter of the prediction space, the generation unit 1202 is configured to:
obtain a first algorithm and determine the first algorithm as the algorithm C when determining, based on the first parameter, that the prediction space has the global spatial autocorrelation characteristic; or obtain a second algorithm and determine the second algorithm as the algorithm C when determining, based on the first parameter, that the prediction space does not have the global spatial autocorrelation characteristic.

In an embodiment, the first algorithm includes a Bayesian hierarchical model BHM algorithm or any method in a Kriging method cluster, and in an aspect of obtaining a first algorithm, the generation unit 1202 is configured to:
determine the BHM algorithm as the first algorithm when the wireless signal received strength of the S first sampling points meets preset probability distribution; or determine any method in the Kriging method cluster as the first algorithm when the wireless signal received strength of the S first sampling points does not meet the preset probability distribution.

In an embodiment, the preset probability distribution may be normal distribution, Poisson distribution, binomial distribution, Gaussian distribution, or other probability distribution.

In an embodiment, the second algorithm includes a machine learning algorithm, any method in a B-shade method cluster, any method in an MSN method cluster, or a stratified Kriging algorithm, and in an aspect of obtaining a second algorithm, the generation unit 1202 is configured to:
perform area division on the prediction space to obtain a plurality of target areas; determine whether each of the plurality of target areas meets a preset condition; and determine the stratified Kriging algorithm as the second algorithm when each of the plurality of target areas meets the preset condition; or obtain a third algorithm and determine the third algorithm as the second algorithm when any one of the plurality of target areas does not meet the preset condition, where the third algorithm includes a machine learning algorithm, any method in the B-shade method cluster, or any method in the MSN method cluster.

In an embodiment, the preset condition includes a first preset condition, a second preset condition, and a third preset condition, and in an aspect of determining the stratified Kriging algorithm as the second algorithm when each of the plurality of target areas meets the preset condition, the generation unit 1202 is configured to:
determine the stratified Kriging algorithm as the second algorithm when each of the plurality of target areas simultaneously meets the first preset condition, the second preset condition, and the third preset condition; and
the obtaining a third algorithm when any one of the plurality of target areas does not meet the preset condition includes:
determining the machine learning algorithm as the third algorithm when any one of the plurality of target areas does not meet the first preset condition; or determining any method in the B-shade method cluster as the third algorithm when any one of the plurality of target areas meets the first preset condition but does not meet the second preset condition; or determining any method in the MSN method cluster as the third algorithm when any one of the plurality of target areas meets the first preset condition and the second preset condition but does not meet the third preset condition.

In an embodiment, the first preset condition includes that the target area has a global spatial autocorrelation characteristic; and the second preset condition includes that the target area includes a first sampling point; and the third preset condition includes that a quantity of first sampling points in the target area is greater than a preset quantity, or the quantity of first sampling points in the target area is greater than the preset quantity and wireless signal received strength of the first sampling point in the target area meets spatial second-order stationarity.

In an embodiment, in an aspect of performing area division on the prediction space to obtain a plurality of target areas, the generation unit 1202 is configured to:

S1: performing area division on the prediction space based on T dimension indicators, to obtain a plurality of first areas, where any one of the plurality of first areas meets some or all of the T dimension indicators;

S2: obtaining a second parameter through calculation based on the plurality of first areas and a geodetector algorithm, where the second parameter is used to indicate a significance degree of spatial stratified heterogeneity of areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold.

T dimension indicators used for any time of area division on the prediction space partially intersect or do not intersect with T dimension indicators used for any other time of area division on the prediction space.

It should be noted that the foregoing units (the obtaining unit 1201 and the generation unit 1202) are configured to perform related content of the foregoing operations S801 to S806, and details are not described herein again.

In this embodiment, the wireless signal propagation prediction apparatus 1200 is presented in a form of units. The "unit" herein may be an application-specific integrated circuit (ASIC), a processor and a memory that execute one or more software or firmware programs, an integrated logic circuit, and/or another device that can provide the foregoing functions. In addition, the obtaining unit 1201 and the generation unit 1202 may be implemented by using a processor 1301 of a wireless signal propagation prediction apparatus shown in FIG. 13.

Figure 13:
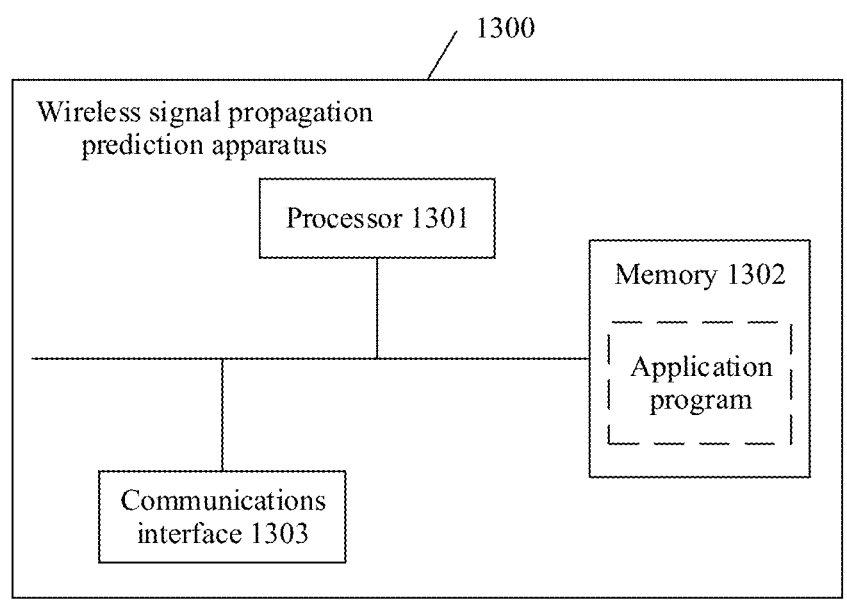
FIG. 13 is a schematic diagram of a structure of another wireless signal propagation prediction apparatus according to an embodiment of this application.

As shown in FIG. 13, the wireless signal propagation prediction apparatus 1300 may be implemented by using a structure in FIG. 13. The wireless signal propagation prediction apparatus 1300 includes at least one processor 1301, at least one memory 1302, and at least one communications interface 1303. The processor 1301, the memory 1302, and the communications interface 1103 are connected and communicate with each other through a communications bus.

The processor 1301 may be a general-purpose central processing unit (CPU), a microprocessor, an application-specific integrated circuit (ASIC), or one or more integrated circuits for controlling program execution of the foregoing solution.

The communications interface 1303 is configured to communicate with another device or a communications network such as the Ethernet, a radio access network (RAN), or a wireless local area network (WLAN).

The memory 1302 may be but is not limited to a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and can be accessed by a computer. The memory may exist independently, and is connected to the processor by using the bus. Alternatively, the memory may be integrated with the processor.

The memory 1302 is configured to store application program code for executing the foregoing solutions, and the processor 1301 controls the execution. The processor 1301 is configured to execute the application program code stored in the memory 1302.

The code stored in the memory 1302 may be used to perform any wireless signal propagation prediction method provided above, such as:

obtaining location information of each of S first sampling points in prediction space and wireless signal received strength of a terminal at a location indicated by the location information, where S is an integer greater than 1; obtaining a first parameter of the prediction space through calculation based on location information of the S first sampling points and corresponding wireless signal received strength, where the first parameter is used to indicate a degree of a global spatial autocorrelation characteristic of the prediction space; obtaining a target algorithm based on the first parameter, and generating a wireless signal propagation model of the prediction space based on the target algorithm, the location information of the S first sampling points, and the corresponding wireless signal received strength; and obtaining wireless signal received strength of the terminal at any location in the prediction space based on the wireless signal propagation model of the prediction space; or obtaining one or more second areas when precision of a first wireless signal propagation model is lower than a prediction precision expectation, where an absolute value of a difference between a predicted value of wireless signal received strength of a terminal in the second area and a check value is greater than a second preset threshold, the predicted value of the wireless signal received strength is obtained through prediction by using the first wireless signal propagation model, and the first wireless signal propagation model is obtained by performing a first operation on location information of S first sampling points and corresponding wireless signal received strength; obtaining N second sampling points, and generating a target wireless signal propagation model based on location information of the S first sampling points and the N second sampling points and corresponding wireless signal received strength, where location information of any one of the N second sampling points is different from location information of each of the S first sampling points, each of the N second sampling points is located in the second area, and N is an integer greater than 0; and obtaining wireless signal received strength of the terminal at any location in prediction space based on the target wireless signal propagation model.

It should be noted herein that, for a process of the wireless signal propagation prediction method, refer to related descriptions of operations S301 to S304 and operations S801 to S806, and details are not described herein again.

An embodiment of this application further provides a computer storage medium. The computer storage medium may store a program, and when the program is executed, some or all of the operations of any wireless signal propagation prediction method described in the foregoing method embodiments are performed.

It should be noted that, for brief description, the foregoing method embodiments are represented as a series of actions. However, a person skilled in the art should appreciate that this application is not limited to the described order of the actions, because based on this application, some operations may be performed in other orders or simultaneously. It should be further appreciated by a person skilled in the art that embodiments described in this specification all belong to example embodiments, and the related actions and modules are not necessarily required in this application.

In the foregoing embodiments, the descriptions of embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the current technology, or all or some of the technical solutions may be implemented in the form of a software product. The computer software product is stored in a memory and includes several instructions for instructing a computer device (which may be a personal computer, a server, or a network device) to perform all or some of the operations of the methods described in embodiments of this application. The foregoing storage medium includes any medium that can store program code, such as a USB flash drive, a read-only memory (ROM), a random access memory (RAM), a removable hard disk, a magnetic disk, or an optical disc.

A person of ordinary skill in the art may understand that all or some of the operations of the methods in embodiments may be implemented by a program instructing related hardware. The program may be stored in a computer-readable memory. The memory may include a flash memory, a read-only memory (ROM), a random access memory (RAM), a magnetic disk, an optical disc, or the like.

Embodiments of this application are described in detail above. The principle and implementation of this application are described herein through specific examples. The description about embodiments of this application is merely provided to help understand the method and core ideas of this application. In addition, a person of ordinary skill in the art can make variations and modifications to this application in terms of the specific implementations and application scopes based on the ideas of this application. Therefore, the content of specification shall not be construed as a limit to this application.

What is claimed is:

1. A method of wireless signal propagation prediction, wherein the method comprises:
   obtaining location information of each of S first sampling points in a prediction space and a wireless signal received strength value of a terminal at a location indicated by the location information, wherein S is an integer greater than 1;
   obtaining a first parameter of the prediction space through calculation based on location information of the S first sampling points and wireless signal received strength values corresponding to the location information of the S first sampling points, wherein the first parameter is used to indicate a degree of a global spatial autocorrelation characteristic of the prediction space;
   obtaining a target algorithm based on the first parameter, and generating a wireless signal propagation model of the prediction space based on the target algorithm, the location information of the S first sampling points, and the corresponding wireless signal received strength values; and
   obtaining a wireless signal received strength value of the terminal at any location in the prediction space based on the wireless signal propagation model of the prediction space.

2. The method according to claim 1, wherein the obtaining the target algorithm based on the first parameter comprises:
   obtaining a first algorithm and determining the first algorithm as the target algorithm when determining, based on the first parameter, that the prediction space has the global spatial autocorrelation characteristic; or
   obtaining a second algorithm and determining the second algorithm as the target algorithm when determining, based on the first parameter, that the prediction space does not have the global spatial autocorrelation characteristic.

3. The method according to claim 2, wherein the first algorithm comprises any method in a Kriging method cluster or a Bayesian hierarchical model (BHM) algorithm, and wherein the obtaining the first algorithm comprises:

determining whether the wireless signal received strength values of the S first sampling points meet a preset probability distribution; and determining the BHM algorithm as the first algorithm when the wireless signal received strength values of the S first sampling points meet the preset probability distribution; or determining any method in the Kriging method cluster as the first algorithm when the wireless signal received strength values of the S first sampling points do not meet the preset probability distribution.

4. The method according to claim 2, wherein the second algorithm comprises a machine learning algorithm, any method in a biased sentinel hospital area disease estimation (B-shade) method cluster, any method in a means of surface with non-homogeneity (MSN) method cluster, or a stratified Kriging algorithm, and wherein the obtaining the second algorithm comprises:

performing area division on the prediction space to obtain a plurality of target areas; and determining the stratified Kriging algorithm as the second algorithm when each of the plurality of target areas meets a preset condition; or obtaining a third algorithm and determining the third interpolation algorithm as the second algorithm when each one of the plurality of target areas does not meet the preset condition, wherein the third algorithm comprises a machine learning algorithm, any method in the B-shade method cluster, or any method in the MSN method cluster.

5. The method according to claim 4, wherein the preset condition comprises a first preset condition, a second preset condition, and a third preset condition, and wherein the determining the stratified Kriging algorithm as the second algorithm when each of the plurality of target areas meets a preset condition comprises:

determining the stratified Kriging algorithm as the second algorithm when each of the plurality of target areas simultaneously meets the first preset condition, the second preset condition, and the third preset condition; and the obtaining the third algorithm when each one of the plurality of target areas does not meet the preset condition comprises:

determining the machine learning algorithm as the third algorithm when each one of the plurality of target areas does not meet the first preset condition; or determining any method in the B-shade method cluster as the third algorithm when each one of the plurality of target areas meets the first preset condition but does not meet the second preset condition; or determining any method in the MSN method cluster as the third algorithm when each one of the plurality of target areas meets the first preset condition and the second preset condition but does not meet the third preset condition.

6. The method according to claim 5, wherein the first preset condition is that the target area has a spatial autocorrelation characteristic;

the second preset condition comprises that the target area comprises a first sampling point; and the third preset condition comprises that a quantity of first sampling points in the target area is greater than a preset quantity, or the quantity of first sampling points in the target area is greater than the preset quantity and wireless signal received strength values of the first sampling point in the target area meet a spatial second-order stationarity.

7. The method according to claim 4, wherein the performing area division on the prediction space to obtain a plurality of target areas comprises:

S1: performing area division on the prediction space based on T dimension indicators, to obtain a plurality of first areas, wherein each one of the plurality of first areas meets some or all of the T dimension indicators, and T is an integer greater than 0;

S2: obtaining a second parameter through calculation based on the plurality of first areas and a geodetector algorithm, wherein the second parameter is used to indicate a significance degree of spatial stratified heterogeneity of areas obtained by performing area division on the prediction space; and S3: repeating S1 to S3 when the second parameter is not greater than a first preset threshold, until the second parameter is greater than the first preset threshold; or determining the plurality of first areas as the plurality of target areas when the second parameter is greater than the first preset threshold, wherein T dimension indicators used for any time of area division on the prediction space partially intersect or do not intersect with T dimension indicators used for any other time of area division on the prediction space.

8. A method of wireless signal propagation prediction, wherein the method comprises:

obtaining one or more second areas when precision of a first wireless signal propagation model is lower than a prediction precision expectation, wherein an absolute value of a difference between a predicted value of a wireless signal received strength value of a terminal in the second area and a check value is greater than a second preset threshold, the predicted value of the wireless signal received strength value is obtained through prediction by using the first wireless signal propagation model, and the first wireless signal propagation model is generated based on location information of S first sampling points and corresponding wireless signal received strength values;

obtaining N second sampling points, and generating a target wireless signal propagation model based on the location information of the S first sampling points in a prediction space and location information of the N second sampling points in the prediction space and wireless signal received strength values corresponding to the location information of the first S first sample points and the location information of the N second sampling points, wherein location information of any one of the N second sampling points is different from location information of each of the S first sampling points, each of the N second sampling points is located in the second area, and N is an integer greater than 0; and obtaining a wireless signal received strength value of the terminal at any location in the prediction space based on the target wireless signal propagation model.

9. The method according to claim 8, wherein the obtaining the N second sampling points, and the generating the target wireless signal propagation model based on the location information of the S first sampling points and the location information of the N second sampling points and the corresponding wireless signal received strength values comprises:

S10: obtaining $N_i$ initial sampling points, wherein location information of each of the $N_i$ initial sampling points is different from that of the S sampling points, each of the $N_i$ initial sampling points is located in the second area, and $N_i$ is an integer greater than 1;

S20: performing random disturbance processing on the $N_i$ initial sampling points to obtain $N_i$ reference sampling points;

S30: generating a wireless signal propagation model $M_i$ based on a preset algorithm, the location information of the S first sampling points and the location information of the N second sampling points, and the corresponding wireless signal received strength values, wherein the N second sampling points comprise a target sampling point set and the $N_i$ reference sampling points, and i is an integer greater than 0; and S40: determining whether the wireless signal propagation model $M_i$ meets a first convergence condition and a second convergence condition; and repeating operations S20 to S40 when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model $M_i$ meets the second convergence condition, wherein the second convergence condition is different from the first convergence condition, and when i=1, the target sampling point set is an empty set.

10. The method according to claim 8, wherein the obtaining the N second sampling points, and the generating the target wireless signal propagation model based on the location information of the S first sampling points and the location information of the N second sampling points and the corresponding wireless signal received strength values comprises:

S10': obtaining $N_i$ initial sampling points, wherein location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength values, wherein the N second sampling points comprise a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition, wherein the second convergence condition is different from the first convergence condition, and when i=1, the sampling point set $A_{i-1}$ is an empty set.

11. The method according to claim 9, wherein the obtaining the $N_i$ initial sampling points comprises:

obtaining a plurality of first reference sampling point sets, wherein sampling points in the plurality of first reference sampling point sets are all located in the second area;

obtaining a plurality of second reference sampling point sets based on the plurality of first reference sampling point sets and the S first sampling points, wherein sampling points in a $j^{th}$ second reference sampling point set comprise the S first sampling points and a sampling point in a $j^{th}$ first reference sampling point set in the plurality of first reference sampling point sets, and j is an integer greater than 0;

generating a plurality of reference wireless signal propagation models based on location information of a sampling point in each of the plurality of second reference sampling point sets and corresponding wireless signal received strength values, wherein the plurality of reference wireless signal propagation models are in a one-to-one correspondence with the plurality of second reference sampling point sets;

obtaining an error value of each of the plurality of reference wireless signal propagation models through calculation based on check data; and obtaining the $N_i$ initial sampling points based on the error value, wherein the $N_i$ initial sampling points are sampling points other than the S first sampling points in a second reference sampling point set corresponding to a smallest error value.

12. The method according to claim 11, wherein the preset algorithm is an algorithm used when a reference wireless signal propagation model corresponding to the smallest error value is generated.

13. The method according to claim 8, wherein that the first wireless signal propagation model is generated based on the location information of S first sampling points and corresponding wireless signal received strength comprises:

calculating a first parameter of the prediction space based on the location information of the S first sampling points and the corresponding wireless signal received strength values, and obtaining an algorithm C based on the first parameter of the prediction space, wherein the first parameter is used to indicate a degree of a global spatial autocorrelation characteristic of the prediction space; and generating the first wireless signal receiving model based on the algorithm C, the location information of the S first sampling points, and the corresponding wireless signal received strength values.

14. The method according to claim 13, wherein the obtaining the algorithm C based on the first parameter of the prediction space comprises:
   obtaining a first algorithm and determining the first algorithm as the algorithm C when determining, based on the first parameter, that the prediction space has the global spatial autocorrelation characteristic; or
   obtaining a second algorithm and determining the second algorithm as the algorithm C when determining, based on the first parameter, that the prediction space does not have the global spatial autocorrelation characteristic.

15. The method according to claim 14, wherein the first algorithm comprises a Bayesian hierarchical model (BHM) algorithm or any method in a Kriging method cluster, and wherein the obtaining the first algorithm comprises:
   determining the BHM algorithm as the first algorithm when the wireless signal received strength values of the S first sampling points meet a preset probability distribution; or
   determining any method in the Kriging method cluster as the first algorithm when the wireless signal received strength value of the S first sampling points does not meet the preset probability distribution.

16. The method according to claim 14, wherein the second algorithm comprises a machine learning algorithm, any method in a biased sentinel hospital area disease estimation (B-shade) method cluster, any method in a means of surface with non-homogeneity (MSN) method cluster, or a stratified Kriging algorithm, and the obtaining the second algorithm comprises:
   performing area division on the prediction space to obtain a plurality of target areas;
   determining whether each of the plurality of target areas meets a preset condition; and
   determining the stratified Kriging algorithm as the second algorithm when each of the plurality of target areas meets the preset condition; or
   obtaining a third algorithm and determining the third algorithm as the second algorithm when each one of the plurality of target areas does not meet the preset condition, wherein
   the third algorithm comprises a machine learning algorithm, any method in the B-shade method cluster, or any method in the MSN method cluster.

17. The method according to claim 16, wherein the preset condition comprises a first preset condition, a second preset condition, and a third preset condition, and wherein the determining the stratified Kriging algorithm as the second algorithm when determining that each of the plurality of target areas meets the preset condition comprises:
   determining the stratified Kriging algorithm as the second algorithm when each of the plurality of target areas simultaneously meets the first preset condition, the second preset condition, and the third preset condition; and
   the obtaining the third algorithm when each one of the plurality of target areas does not meet the preset condition comprises:
   determining the machine learning algorithm as the third algorithm when each one of the plurality of target areas does not meet the first preset condition; or
   determining any method in the B-shade method cluster as the third algorithm when each one of the plurality of target areas meets the first preset condition but does not meet the second preset condition; or
   determining any method in the MSN method cluster as the third algorithm when each one of the plurality of target areas meets the first preset condition and the second preset condition but does not meet the third preset condition.

18. The method according to claim 17, wherein the first preset condition comprises that the target area has a global spatial autocorrelation characteristic;
   the second preset condition comprises that the target area comprises a first sampling point; and
   the third preset condition comprises that a quantity of first sampling points in the target area is greater than a preset quantity, or the quantity of first sampling points in the target area is greater than the preset quantity and wireless signal received strength values of the first sampling point in the target area meet a spatial second-order stationarity.

19. The method according to claim 16, wherein the performing the area division on the prediction space to obtain a plurality of target areas comprises:
   S1: performing area division on the prediction space based on T dimension indicators, to obtain a plurality of first areas, wherein any one of the plurality of first areas meets some or all of the T dimension indicators, and T is an integer greater than 0;
   S2: obtaining a second parameter through calculation based on the plurality of first areas and a geodetector algorithm, wherein the second parameter is used to indicate a significance degree of spatial stratified heterogeneity of areas obtained by performing area division on the prediction space; and
   S3: repeating S1 to S3 when the second parameter is not greater than a first preset threshold, until the second parameter is greater than the first preset threshold; or determining the plurality of first areas as the plurality of target areas when the second parameter is greater than the first preset threshold, wherein
   T dimension indicators used for any time of area division on the prediction space partially intersect or do not intersect with T dimension indicators used for any other time of area division on the prediction space.

20. An apparatus for wireless signal propagation prediction, comprising:
   a processor;
   a memory coupled to the processor, and configured to store program instructions; which, when executed by the processor, cause the apparatus to perform operations comprising:
   obtaining location information of each of S first sampling points in a prediction space and a wireless signal received strength value of a terminal at a location indicated by the location information, wherein S is an integer greater than 1;
   obtaining a first parameter of the prediction space through calculation based on location information of the S first sampling points and wireless signal received strength values corresponding to the location information of the S first sampling points, wherein the first parameter is used to indicate a degree of a global spatial autocorrelation characteristic of the prediction space;
   obtaining a target algorithm based on the first parameter, and generating a wireless signal propagation model of the prediction space based on the target algorithm, the location information of the S first sampling points, and the corresponding wireless signal received strength values; and obtaining a wireless signal received strength value of the terminal at any location in the prediction space based on the wireless signal propagation model of the prediction space.

21. The apparatus according to claim 20, wherein the obtaining the target algorithm based on the first parameter comprises:
   obtaining a first algorithm and determine the first algorithm as the target algorithm when determining, based on the first parameter, that the prediction space has the global spatial autocorrelation characteristic; or
   obtaining a second algorithm and determine the second algorithm as the target algorithm when determining, based on the first parameter, that the prediction space does not have the global spatial autocorrelation characteristic.

22. The apparatus according to claim 21, wherein the first algorithm comprises any method in a Kriging method cluster or a Bayesian hierarchical model (BHM) algorithm, and the obtaining the first algorithm, the processor comprises:
   determining whether the wireless signal received strength values of the S first sampling points meet a preset probability distribution; and
   determining the BHM algorithm as the first algorithm when the wireless signal received strength values of the S first sampling points meets the preset probability distribution; or
   determining any method in the Kriging method cluster as the first algorithm when the wireless signal received strength values of the S first sampling points do not meet the preset probability distribution.

23. The apparatus according to claim 21, wherein the second algorithm comprises a machine learning algorithm, any method in a biased sentinel hospital area disease estimation (B-shade) method cluster, any method in a means of surface with non-homogeneity (MSN) method cluster, or a stratified Kriging algorithm; and
   wherein the obtaining the second algorithm comprises
   performing area division on the prediction space to obtain a plurality of target areas; and
   determining the stratified Kriging algorithm as the second algorithm when each of the plurality of target areas meets a preset condition; or
   obtaining a third algorithm and determine the third interpolation algorithm as the second algorithm when each one of the plurality of target areas does not meet the preset condition, wherein
   the third algorithm comprises a machine learning algorithm, any method in the B-shade method cluster, or any method in the MSN method cluster.

24. An apparatus for wireless signal propagation prediction, comprising:
   a processor;
   a memory coupled to the processor, and configured to store program instructions, which, when executed by the processor, cause the apparatus to perform operations comprising:
   obtaining one or more second areas when precision of a first wireless signal propagation model is lower than a prediction precision expectation, wherein an absolute value of a difference between a predicted value of a wireless signal received strength value of a terminal in the second area and a check value is greater than a second preset threshold, the predicted value of the wireless signal received strength value is obtained through prediction by using the first wireless signal propagation model, and the first wireless signal propagation model is generated based on location information of S first sampling points and corresponding wireless signal received strength values;
   obtaining N second sampling points, and generating a target wireless signal propagation model based on the location information of the S first sampling points in a prediction space and location information of the N second sampling points in the prediction space and wireless signal received strength values corresponding to the location information of the first S first sample points and the location information of the N second sampling points, wherein location information of any one of the N second sampling points is different from location information of each of the S first sampling points, each of the N second sampling points is located in the second area, and N is an integer greater than 0; and
   obtaining a wireless signal received strength value of the terminal at any location in the prediction space based on the target wireless signal propagation model.

25. The apparatus according to claim 24, wherein the obtaining the N second sampling points, and the generating the target wireless signal propagation model based on the location information of the S first sampling points and the location information of the N second sampling points and the corresponding wireless signal received strength values comprises:
   S10: obtaining $N_i$ initial sampling points, wherein location information of each of the $N_i$ initial sampling points is different from that of the S sampling points, each of the $N_i$ initial sampling points is located in the second area, and $N_i$ is an integer greater than 1;
   S20: performing random disturbance processing on the $N_i$ initial sampling points to obtain $N_i$ reference sampling points;
   S30: generating a wireless signal propagation model $M_i$ based on a preset algorithm, the location information of the S first sampling points and the location information of the N second sampling points, and the corresponding wireless signal received strength values, wherein the N second sampling points comprise a target sampling point set and the $N_i$ reference sampling points, and i is an integer greater than 0; and
   S40: determining whether the wireless signal propagation model $M_i$ meets a first convergence condition and a second convergence condition; and repeating operations S20 to S40 when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the target sampling point set, setting i=i+1, and repeating S10 to S40, until the wireless signal propagation model $M_i$ meets the second convergence condition; or determining the wireless signal propagation model $M_i$ as the target wireless signal propagation model when the wireless signal propagation model $M_i$ meets the second convergence condition, wherein
   the second convergence condition is different from the first convergence condition, and when i=1, the target sampling point set is an empty set.

26. The apparatus according to claim 24, wherein the obtaining the N second sampling points, and the generating the target wireless signal propagation model based on the location information of the S first sampling points and the location information of the N second sampling points and the corresponding wireless signal received strength values comprises:

S10': obtaining $N_i$ initial sampling points, wherein location information of each of the $N_i$ initial sampling points is different from that of the S sampling points, each of the $N_i$ initial sampling points is located in the second area, and $N_i$ is an integer greater than 1;

S20': performing random disturbance processing on a sampling point in a sampling point set $A_{i-1}$ to obtain a sampling point set $A'_{i-1}$, and performing random disturbance processing on the $N_i$ initial sampling points to obtain $N_i$ reference sampling points;

S30': generating a wireless signal propagation model $M_i$ based on a preset algorithm, the location information of the S first sampling points and the N second sampling points, and the corresponding wireless signal received strength values, wherein the N second sampling points comprise a sampling point in the sampling point set $A'_{i-1}$ and the $N_i$ reference sampling points, and i is an integer greater than 0; and S40': determining whether the wireless signal propagation model $M_i$ meets a first convergence condition and a second convergence condition; and repeating operations S20' to S40' when the wireless signal propagation model $M_i$ does not meet the first convergence condition, until the wireless signal propagation model $M_i$ meets the first convergence condition; or when the wireless signal propagation model $M_i$ meets the first convergence condition but does not meet the second convergence condition, saving the $N_i$ reference sampling points in the sampling point set $A'_{i-1}$ to obtain a sampling point set $A_i$, setting i=i+1, and repeating S10' to S40', until the wireless signal propagation model $M_i$ meets the second convergence condition; or determining the wireless signal propagation model $M_i$ as the target wireless signal propagation model when the wireless signal propagation model $M_i$ meets the second convergence condition, wherein the second convergence condition is different from the first convergence condition, and when i=1, the sampling point set $A_{i-1}$ is an empty set.

27. The apparatus according to claim 25, wherein the obtaining the $N_i$ initial sampling points comprises:
obtaining a plurality of first reference sampling point sets, wherein sampling points in the plurality of first reference sampling point sets are all located in the second area;
obtaining a plurality of second reference sampling point sets based on the plurality of first reference sampling point sets and the S first sampling points, wherein sampling points in a $j^{th}$ second reference sampling point set comprise the S first sampling points and a sampling point in a $j^{th}$ first reference sampling point set in the plurality of first reference sampling point sets, and j is an integer greater than 0;
generating a plurality of reference wireless signal propagation models based on location information of a sampling point in each of the plurality of second reference sampling point sets and corresponding wireless signal received strength values, wherein the plurality of reference wireless signal propagation models are in a one-to-one correspondence with the plurality of second reference sampling point sets;
obtaining an error value of each of the plurality of reference wireless signal propagation models through calculation based on check data; and
obtaining the $N_i$ initial sampling points based on the error value, wherein the $N_i$ initial sampling points are sampling points other than the S first sampling points in a second reference sampling point set corresponding to a smallest error value.

28. The apparatus according to claim 27, wherein the preset algorithm is an algorithm used when a reference wireless signal propagation model corresponding to the smallest error value is generated.

29. The apparatus according to claim 24, wherein when the first wireless signal propagation model is generated based on the location information of the S first sampling points and the corresponding wireless signal received strength values, the operations further comprise:
calculating a first parameter of the prediction space based on the location information of the S first sampling points and the corresponding wireless signal received strength values, and obtain an algorithm C based on the first parameter of the prediction space, wherein the first parameter is used to indicate a degree of a global spatial autocorrelation characteristic of the prediction space; and
generating the first wireless signal receiving model based on the algorithm C, the location information of the S first sampling points, and the corresponding wireless signal received strength values.

30. The apparatus according to claim 29, wherein the obtaining the algorithm C based on the first parameter of the prediction space comprises:
obtaining a first algorithm and determining the first algorithm as the algorithm C when determining, based on the first parameter, that the prediction space has the global spatial autocorrelation characteristic; or
obtaining a second algorithm and determining the second algorithm as the algorithm C when determining, based on the first parameter, that the prediction space does not have the global spatial autocorrelation characteristic.

* * * * *